(12) United States Patent
Greenwood et al.

(10) Patent No.: US 11,609,193 B2
(45) Date of Patent: Mar. 21, 2023

(54) SPECTROSCOPY AND IMAGING SYSTEM

(71) Applicant: VG Systems Limited, Chesire (GB)

(72) Inventors: Oliver Greenwood, East Grinstead (GB); Adam Bushell, East Grinstead (GB); Michael Hugh Humpherson, Redhill (GB)

(73) Assignee: VG Systems Limited, East Grinstead (GB)

( * ) Notice: Subject to any disclaimer, the term of this patent is extended or adjusted under 35 U.S.C. 154(b) by 126 days.

(21) Appl. No.: 16/936,643

(22) Filed: Jul. 23, 2020

(65) Prior Publication Data

US 2021/0033551 A1    Feb. 4, 2021

(30) Foreign Application Priority Data

Jul. 30, 2019  (GB) ...................................... 1910880

(51) Int. Cl.
*G01N 23/227*       (2018.01)
*G01N 23/2273*      (2018.01)

(52) U.S. Cl.
CPC ..... *G01N 23/2273* (2013.01); *G01N 2223/07* (2013.01); *G01N 2223/40* (2013.01); *G01N 2223/507* (2013.01)

(58) Field of Classification Search
CPC ............ G01N 23/2273; G01N 23/227; G01N 2223/507; G01N 2223/40; G01N 2223/07;
(Continued)

(56) References Cited

U.S. PATENT DOCUMENTS 3,629,578 A   12/1971 Le Poole
4,554,457 A   11/1985 Kelly
(Continued)

FOREIGN PATENT DOCUMENTS

EP    0137650 A2    4/1985
EP    0246841 B1    7/1991
(Continued)

OTHER PUBLICATIONS

Combined Search and Examination Report dated Jan. 16, 2020, issued to GB Patent Application No. GB1910880.2.
(Continued)

*Primary Examiner* — Jurie Yun

(57) ABSTRACT

An apparatus and method for characterisation of a sample via spectroscopy and/or imaging. The apparatus comprises a first detector for imaging or spectroscopy, a second detector for imaging or spectroscopy, and a toroidal capacitor type electrostatic energy analyser. The toroidal capacitor type electrostatic energy analyser comprises a first and a second entrance aperture arranged such that charged particles emitted from a sample and passing through the first entrance aperture traverse a first trajectory through the toroidal capacitor type electrostatic energy analyser to be incident at the first detector, and charged particles emitted from a sample and passing through the second entrance aperture traverse a second trajectory through the toroidal capacitor type electrostatic energy analyser to be incident at the second detector. A deflection assembly arranged between the sample and the analyser may be used to direct charged particles emitted from the sample towards the first and/or second entrance aperture of the analyser.

21 Claims, 10 Drawing Sheets

(58) Field of Classification Search
CPC ........ H01J 49/009; H01J 49/025; H01J 49/48; H01J 49/484
See application file for complete search history.

(56) References Cited

U.S. PATENT DOCUMENTS

| | | |
|---|---|---|
| 4,758,723 A | 7/1988 | Wardell et al. |
| 5,185,524 A | 2/1993 | Page |
| 6,104,029 A | 8/2000 | Coxon et al. |
| 2006/0060770 A1 | 3/2006 | Page et al. |
| 2010/0127168 A1 | 5/2010 | Khursheed |
| 2011/0069862 A1 | 3/2011 | Krizek et al. |
| 2016/0336166 A1 | 11/2016 | Wannberg et al. |

FOREIGN PATENT DOCUMENTS

| | | |
|---|---|---|
| EP | 0458498 A2 | 11/1991 |
| JP | H06-8844 | 1/1994 |
| JP | 2006-505900 A | 2/2006 |
| JP | 2015-511055 A | 4/2015 |

OTHER PUBLICATIONS

Schaefer, C H: "A theoretical performance comparison of six electrostatic e-beam deflectors", Journal of Vacuum Science & Technology B, vol. 4, No. 5, Sep./Oct. 1986.
JP Office action dated Sep. 27, 2021, to JP Application No. 2020-128928.

SPECTROSCOPY AND IMAGING SYSTEM

CLAIM TO PRIORITY

This application claims the benefit of United Kingdom patent application no. 1910880.2, entitled "A Spectroscopy and Imaging System" by Oliver Greenwood, and filed on Jul. 30, 2019. The content of the above-identified application is incorporated herein by reference in its entirety.

FIELD OF THE INVENTION

The invention relates to an apparatus and method for characterisation of a sample, in particular by spectroscopy and/or imaging of a sample surface. In one example, the invention is operable to provide both spectroscopy and/or imaging within a common apparatus. The apparatus may form part of an X-ray photoelectron spectrometer, although the apparatus may also be used for other types of spectroscopy.

BACKGROUND TO THE INVENTION

Spectroscopy and imaging are powerful tools for characterising a sample. Various forms of spectroscopy and imaging are known in the art. In one example, X-ray photoelectron spectroscopy (XPS) is a widely used surface analysis technique for characterisation of the uppermost layers of a material sample. Further knowledge of the surface chemistry of a sample can be obtained via imaging using photoelectrons generated from a sample in an X-ray photoelectron spectrometer.

Well-known methods for XPS rely on the irradiation of a sample surface with X-rays of defined wavelength, resulting in photoelectrons being emitted from the sample surface as a consequence of the photoelectric effect. Photoelectrons emitted from the sample surface are then passed to an energy analyser (typically, an electrostatic hemispherical analyser) which disperse the particles according to their energy. The photoelectrons exiting from the energy analyser are incident to a detector, where, as a result of their dispersion, the position of the photoelectrons received at the detector can be used to determine the photoelectron energy (and accordingly various quantitative elemental and chemical state information for the sample surface).

XPS can also be used to image the surface of a sample. In this configuration, the photoelectrons emitted from the sample surface are passed through the energy analyser and are incident to an imaging detector. Two approaches for obtaining XPS images are widely used: serial acquisition or parallel acquisition. Serial acquisition requires obtaining a series of small-area XPS analyses that can be mapped as a two-dimensional array, in order to build an image of the sample surface. Parallel acquisition simultaneously images the entire field of view without scanning voltages applied to any spectrometer component.

It is advantageous for a single apparatus to be able to provide both spectroscopy and imaging characterisation. A number of prior art systems have been developed which can perform both these functions. One such example is described in European Patent Publication No. 0,458,498, which describes a spectrometer having effective first and second concentric hemispherical electrostatic analysers. Both analysers share a common entrance and exit aperture. Photoelectrons may be passed on one of two pathways through the apparatus, according to the mode of operation. In a spectroscopy mode, photoelectrons are passed along a first pathway, in which the photoelectrons are received through the common entrance and then traverse the first, inner hemispherical electrostatic analyser, until exiting through the common exit aperture. In an imaging mode, the photoelectrons are transmitted along a second pathway. On the second pathway, photoelectrons are received through the common entrance aperture and then passed through a small portion of the first hemispherical electrostatic analyser, through a first baffle in a wall between the first and second hemispherical electrostatic analysers to then traverse the second, outer hemispherical electrostatic analyser. The photoelectrons are then returned through a second baffle in the wall between the first and second hemispherical electrostatic analyser and through a portion of the first hemispherical electrostatic analyser, to the common exit aperture. In both modes, the photoelectrons exiting the common exit aperture are received at a common detector. This apparatus therefore not only requires the provision and configuration of two concentric energy analysers, but further involves use of a common detector and common arrangement of electrostatic lenses to direct and collimate the photoelectrons at the entrance and exit of the energy analyser.

Another option is provided by U.S. Pat. No. 4,758,723, which describes a spectrometer that makes use of a single hemispherical electrostatic analyser, causing a beam of charged particles passing through the analyser to disperse according to their energy. The analyser has a single entrance and exit aperture. Upon exit from the analyser, the majority of the charged particles are received at the surface of a spectroscopy detector (such as a microchannel plate detector). However, a portion of the charged particles pass through a central hole or opening in the spectroscopy detector, and towards an image detector. Beneficially, this apparatus allows simultaneous detection for spectroscopy and imaging. However, a portion of the spectroscopy spectra is lost to the image detector, which decreases the detector efficiency. Furthermore, a "snapshot" spectra (providing a spectra across a complete range of energies) cannot be obtained without scanning hemisphere voltages at the analyser.

Thus, it is an objective of the present invention to provide an apparatus and method for characterisation of a sample, and more particularly spectroscopy and/or imaging of a sample surface, which overcome the drawbacks of the spectrometers and spectroscopy techniques described above.

SUMMARY OF INVENTION

Accordingly, there is described an apparatus and method for characterisation of a sample, and more particularly for spectroscopy and imaging of a sample surface. The apparatus comprises an energy analyser through which two separate trajectories or pathways for charged particles are defined. The charged particles may be ions or electrons, for instance. The two trajectories are established by entrance of charged particles into the energy analyser through different entrance apertures at different positions for the respective trajectories. Significantly the charged particles will exit the analyser at different positions on the exit plane of the analyser, as a consequence of the different trajectories, and so can be emitted towards separate detectors. Each of the detectors can be of different types or otherwise optimised for specific measurements (or types of measurement), such as for imaging or for spectroscopy. As such, the described energy analyser can be used for different types or modes of measurement without requiring extensive reconfiguration between each measurement mode. Furthermore, the full detection surface of a detector can be used for a given measurement on a given trajectory, without requiring any portion of the charged particles on that trajectory being passed to another detector to form part of another measurement.

In order for charged particles emitted from a single sample to enter the energy analyser at different positions, the 'beam' of charged particles from the surface of the sample must be selectively redirected or be split. This can be accomplished by use of suitable charged particles optics.

In a first example, the charged particle beam (which would otherwise enter the energy analyser at a first position though a first entrance aperture) is redirected by suitable charged particle optics to instead enter the energy analyser at a second position though a second entrance aperture. In this case, the charged particle optics may comprise at least one electrostatic deflector. For instance, an arrangement of deflectors can be used to first redirect the charged particle beam away from a first 'undeflected' pathway, which enters the energy analyser though a first entrance aperture, to instead be directed along a second 'deflected' pathway and towards a second entrance aperture at the energy analyser. As such, charged particles can selectively pass through either the first or second trajectory (which each eventually impinge on a first or second detector, respectively), by control of the charged particle optics (or arrangement of deflectors).

In a second example, suitable charged particle optics can be used to allow simultaneous measurement of charged particles projected along two different trajectory through the energy analyser. In this case, the charged particle beam is split. In particular, the charged particle optics can be used to allow transmission of a first portion of the charge particles (as emitted from the sample surface) towards a first entrance of the energy analyser, and at the same time direct a second portion of the charged particles towards a second entrance of the energy analyser. The first and second entrance apertures to the energy analyser are associated with a first and second trajectory through the analyser respectively, which are incident at respective first and second detectors, as discussed above. In this way the first and second portion of the charged particle beam may be simultaneously measured at different first and second detectors associated with the first and second trajectory.

A particular advantage of the described invention resides in the ability to optimise the electron optics, the aperture size, the detector, and other aspects, to the particular measurement of the charged particles travelling the different pathways or trajectories though the apparatus. Furthermore, a user can selectively change between pathways (or mode of measurement) simply through control of the charged particle optics.

In a first aspect, there is described an apparatus for characterisation of a sample, comprising a first detector for imaging or spectroscopy, a second detector for imaging or spectroscopy, and a toroidal capacitor type electrostatic energy analyser. The toroidal capacitor type electrostatic energy analyser comprises a first and a second entrance aperture arranged such that charged particles emitted from a sample and passing through the first entrance aperture traverse a first trajectory through the toroidal capacitor type electrostatic energy analyser to be incident at the first detector, and charged particles emitted from a sample and passing through the second entrance aperture traverse a second trajectory through the toroidal capacitor type electrostatic energy analyser to be incident at the second detector.

The toroidal capacitor type electrostatic energy analyser is an electrostatic device used to disperse charged particles as a function of their energy. The energy analyser comprises at least two electrodes for generating an electrostatic field therebetween, through which the charged particles pass. The toroidal capacitor type electrostatic energy analyser comprises two concentric electrodes. In general, the concentric electrodes may each be hemispheres, such that particles moving between the two concentric electrodes pass through a 180° deflection. However, the electrodes of the toroidal capacitor type electrostatic energy analyser may not be an exact hemisphere (and so may require a deflection less than or greater than 180°), or alternatively a non-spherical toroidal electrostatic analyser may also be used.

The first and the second detector may be of any type suitable for imaging and/or spectroscopy. The specific type of detector can be selected based on the particular type of measurement of the charged particles passing along each of the first or the second trajectory. Detectors will preferably provide position sensitive detection, so as to differentiate between charged particles received at different regions of the detector surface (and therefore are able to distinguish between energy dispersed charged particles received from the energy analyser). Examples of suitable detectors for spectroscopy include a microchannel plate with a position-sensitive anode; a microchannel plate with a delay-line; multiple channel electron multipliers; a phosphor-screen camera; or a complementary metal-oxide-semiconductor (CMOS) detector. Examples of suitable detectors for imaging include a microchannel plate with a position-sensitive anode; a microchannel plate with a delay-line; a phosphor-screen camera; or a CMOS detector.

Preferably, the first detector is for imaging, and the second detector is for spectroscopy. Alternatively, the second detector may be for imaging and the first detector may be for spectroscopy. In particular, the apparatus may advantageously provide a trajectory for use in an imaging mode, and another, different trajectory for use in a spectroscopy mode. However, in some examples the first and second detector may both be for spectroscopy, or both be for imaging.

Preferably, the first entrance aperture to the toroidal capacitor type electrostatic energy analyser is displaced by an azimuthal angle from the second entrance aperture to the toroidal capacitor type electrostatic energy analyser. In other words, at the plane of the first and second entrance apertures, the second entrance aperture is displaced by an angle about the centre of the energy analyser compared to the first entrance aperture. Preferably, the azimuthal angle between the first and second entrance aperture is not greater than 90°, more preferably between 25° and 90°. In a particular example, the azimuthal angle may be around 45°. The azimuthal angle may be chosen to provide sufficient displacement or space to allow arrangement of different charged particle optics on the charge particle pathway prior to entrance to the analyser (as described below).

Preferably, the first entrance aperture may be arranged at the same radial distance as the second entrance aperture. Alternatively, the first and second entrance apertures may be at a greater or lesser radial distance compared to each other. As such, the first and second entrance apertures can be radially displaced compared to each other (as well as, or instead of, displaced by an azimuthal angle).

The toroidal capacitor type electrostatic energy analyser may further comprise a first and a second exit aperture, arranged such that charged particles traversing the first trajectory through the toroidal capacitor type electrostatic energy analyser pass through the first exit aperture, and charged particles traversing the second trajectory through the toroidal capacitor type electrostatic energy analyser pass through the second exit aperture. The first exit aperture may be displaced by an azimuthal angle from the second exit aperture. The first and second exit apertures may be displaced by the same azimuthal angle as the first and the second entrance apertures. As such, the first trajectory through the toroidal capacitor type electrostatic energy analyser may be defined at an (non-zero) azimuthal angle from the second trajectory through the toroidal capacitor type electrostatic energy analyser.

Preferably, the first and the second exit apertures comprise a first and a second exit slit, respectively. More preferably still, the first and second exit slits have a length in a direction perpendicular to the radial direction of the exit plane of the toroidal capacitor type electrostatic energy analyser, and the length of the second exit slit is greater than the length of the first exit slit. As an alternative, the length of the first exit slit is greater than the length of the second exit slit. Beneficially, the size (or length) of the exit slit can be selected differently for the first and second exit aperture, to be optimised for the type of measurement being performed on charged particles travelling along either the first or second trajectory. For instance, the slit length may be larger (for example, 3-8 mm) for the trajectory having a detector used for spectroscopy, in order to allow the greatest possible signal to fully fill the analyser (thereby improving resolution). Furthermore, the slit length may be smaller (for example, 0.5-2 mm) for the trajectory having a detector used for imaging, thereby reducing aberration.

Preferably, the apparatus further comprises a deflector arrangement or deflection assembly, arranged to direct charged particles emitted from the sample along a first path towards the first entrance aperture of the toroidal capacitor type electrostatic energy analyser and/or along a second path towards the second entrance aperture of the toroidal capacitor type electrostatic energy analyser. For example, in a first mode of operation, the deflector arrangement or deflection assembly can be arranged to direct charged particles emitted from the sample along the first path towards the first entrance aperture of the toroidal capacitor type electrostatic energy analyser and, in a second mode of operation, the deflector arrangement or deflection assembly can be arranged to direct charged particles emitted from the sample along the second path towards the second entrance aperture of the toroidal capacitor type electrostatic energy analyser.

The deflection arrangement or deflector assembly may be any configuration of deflectors, lenses and other charged particle optics that cause redirection together with collimation or focusing of the charged particle beam. The deflection assembly comprises charged particle optics (such as electrostatic lenses or deflectors), arranged to controllably re-direct charged particles. The deflector assembly may comprise one, two, or any number of deflectors as required to re-direct the charged particles along either a first or a second pathway (such as from the pathway of the "undeflected" beam to a new pathway).

As will be understood by the person skilled in the art, the first and second path or trajectory may be considered a first and a second charged particle path or trajectory, such as a first and a second ion path or trajectory, or a first and a second electron path or trajectory.

Optionally, the deflection assembly is arranged to direct charged particles emitted from a sample away from the first path and along the second path. For instance, the first path may be the path taken by charged particles emitted from a sample, and transmitted without deflection or redirection. Some or all of the charged particles may be re-directed from the first path by deflection by the deflector assembly to a new or second path.

The deflection assembly may comprise a first deflector arranged to deflect the charged particles from the first path, and a second deflector arranged to further deflect the deflected charged particles towards the second entrance aperture of the toroidal capacitor type electrostatic energy analyser. In other words, the deflector assembly may comprise two or more deflectors, first to deflect some or all of the charged particles at an angle away from the first path, and then second to deflect the previously deflected charged particles at a further angle, so as to be re-directed towards a selected entrance aperture of the energy analyser. As will be understood by the skilled person, the deflector assembly may comprise any number of deflectors suitable for re-directing the charged particles beam to the appropriate entrance aperture of the energy analyser.

In a further example, the deflector assembly may comprise only a first deflector. In particular, a first portion of charged particles may be emitted approximately perpendicular to the surface of the sample and travel towards a first aperture of the energy analyser along a first path, without deflection. A second portion of charged particles may simultaneously be emitted at an acute azimuthal angle from the surface of the sample, and may travel along a second path at an angle to the first path. A first deflector may be used to deflect the second portion of the charged particles towards the second entrance aperture of the energy analyser. In this way, charged particles can travel along the first and second path and be received at the respective first and second entrance apertures of the energy analyser simultaneously. The charged particles then proceed to travel either the first or second trajectory though the energy analyser. Consequently, simultaneous measurement of the first and second portion of the charged particles at the first and second detectors can be realised.

The deflectors of the deflector assembly may comprise electrostatic field plates with strip electrodes, each strip electrode arranged downstream of the charged particle beam being charged to a successively higher voltage. This type of deflector can generate approximately parallel sideways deflecting field-lines, which can guide and re-direct the charged particles as required. The specific voltages applied to the electrodes to generate a suitable electrostatic field may depend on the particular deflector geometry (including the spacing between electrodes and their dimensions). The voltages may be between a fraction of the energy of the charged particles being deflected, up to several times the energy of the charged particles being deflected. For example, the voltages may be between 0.1 to 10 times the energy of the charged particles being deflected, or may be between 0.2 to 5 times the energy of the charged particles being deflected, or may be between 0.5 to 2 times the energy of the charged particles being deflected. In one example, a potential of ±40V applied across the strip electrodes may be sufficient to deflect electrons having an energy of around 57 eV.

Alternatively, the deflectors of the deflector assembly may comprise electrostatic monopole deflectors, or magnetic deflectors.

Preferably, the apparatus further comprises rotator optics positioned on the first path or the second path, arranged such that charged particles pass through the rotator optics prior to passing through the first or the second entrance aperture, respectively. The rotator optics comprises charged particle optics for providing optimum angular rotation of the charged particle beam, so as to pass the greatest possible flux through the analyser. In doing so, the rotator optics cause shaping of the beam—by compression of the beam in a first direction perpendicular to the direction of travel, and by elongation in a second, dispersive direction, orthogonal to the first direction and perpendicular to the direct of travel—so as to provide a rectangular or ribbon cross-section for the charged particle beam. A rotator lens (or magnetic rotator) then rotates all angles of the resulting rectangular beam so that angles associated with the narrow dispersive direction are subsequently in the wide-angle accepting non-dispersive direction of the energy analyser. In an example, the rotator optics comprises an Einzel lens to shape the charged particles beam, together with a rotator lens (or magnetic rotator). Optionally, the rotator optics could comprise the magnetic rotator described in U.S. Pat. No. 4,554,457. Advantageously, use of rotator optics can greatly increase spectroscopy sensitivity through the energy analyser (for instance, by around three times), compared to the same apparatus used without the rotator optics.

Optionally, the rotator optics are arranged on the second path. Alternatively, the rotator optics could be used on the first path. The rotator optics are most advantageous when used on the path associated with a spectroscopy measurement (i.e. on the path eventually incident at a spectroscopy detector). As noted above, use of the rotator optics can increase the sensitivity of a spectroscopy measurement. Furthermore, use of rotator optics on a path associated with an imaging pathway can be detrimental, because imaging is very sensitive to distortion or obstruction by magnetic or electrostatic fields. Thus, as the described apparatus defines two separate pathways through the energy analyser, which can each be associated with either imaging or with spectroscopy, advantageously rotator optics can be employed, but only on a spectroscopy pathway. As such the described apparatus provides further benefits than compared to known systems.

Preferably, a common input lens may be arranged to receive charged particles emitted from the sample. Specifically, the common input lens may be arranged between the sample and a deflector assembly, so that all charged particles pass through the common input lens, irrespective of whether they are eventually transmitted on the first or the second path. The common input lens may act to collimate the charged particles emitted from the sample surface. The common input lens may also allow collection of particles emitted from the sample within a large 'cone' of emission angles, and be focused or redirected toward the deflector assembly and/or an entrance slit.

Beneficially, further charged particle optics can be arranged downstream of a deflector, in order to focus and/or control the size and shape of the charged particle beam on each path. For example, different, separate charge particle optics could be included on the first path (arranged to enter the analyser through the first entrance slit) than compared to the second path (arranged to enter the analyser through the second entrance slit). As such, the charged particle optics on each pathway can be tailored to the particular analysis of each pathway.

Preferably, a further input lens is arranged on the first path. The further input lens may be arranged between the deflector assembly and the first entrance aperture to the energy analyser (i.e. upstream of the first trajectory though the energy analyser). Alternatively, the further input lens could be arranged on the second path. The further input lens then may be arranged between the deflector assembly and the second entrance aperture to the energy analyser (i.e. upstream of the second trajectory though the energy analyser). More than one further input lens could be used, for instance a first further input lens may be arranged on the first path, and a second further input lens may be arranged on the second path. The one or more further input lens may be used to collimate the charged particle beam, and to regulate the angle of charged particles entering the energy analyser through the entrance apertures. Use of a further input lens may provide particular advantages on a path eventually incident at a detector for imaging, as aberration in the measured images may be reduced.

Preferably, an output lens is arranged on the first and/or the second path. Specifically, an output lens may be arranged such that charged particles exiting the energy analyser (for instance through a first or second exit aperture) pass through the output lens before being incident at the first or second detector. It may be particularly advantageous to arrange an output lens prior to a detector for imaging, so that the output lens may focus the charged particle beam on to the imaging detector.

Optionally, a first and a second alpha plate may be arranged such that charged particles pass through the first alpha plate prior to passing through the first entrance aperture, and/or charged particles pass through the second alpha plate prior to passing through the second entrance aperture. In this example, alpha plates may serve as a 'fringe field corrector' device, correcting an electric field that is theoretically linear and uniform between the hemispheres, but which in practice is not linear and uniform at the boundaries.

Preferably, the apparatus described herein (for instance comprising by not limited to the sample, the deflector assembly, the energy analyser and the detectors) are housed within a vacuum chamber. In particular, charged particles emitted from the sample travel either or both of the first or the second pathway travel through the vacuum chamber, which is kept at low pressure or very low pressure.

In a second aspect there is described a method of characterisation of a sample, comprising: receiving at a toroidal capacitor type electrostatic energy analyser charged particles emitted from a sample, wherein the toroidal capacitor type electrostatic energy analyser comprises a first and a second entrance aperture and the received charged particles pass through the first or the second entrance aperture on entry to the toroidal capacitor type electrostatic energy analyser; and traversing the charged particles received through the first entrance aperture on a first trajectory through the electrostatic analyser to be incident at a first detector for imaging or spectroscopy, and/or traversing the charged particles received through the second entrance aperture on a second trajectory through the electrostatic analyser to be incident at a second detector for imaging or spectroscopy.

The details of each of the features discussed above with respect to the described apparatus also apply to the like features considered below with respect to the described method.

According to the described method, the first detector may be for imaging, and the second detector may be for spectroscopy. However, in an alternative, the second detector may be for imaging, and the first detector for spectroscopy. In a further example, both the first and second detectors are for spectroscopy. The first and second detector may be of any type suitable for imaging and/or for spectroscopy, including the specific examples previously listed.

Optionally, a first portion of the charged particles traverses the first trajectory simultaneously with a second portion of the charged particles traversing the second trajectory. In particular, a first portion of the charged particles emitted from the sample may be received through the first entrance aperture of the energy analyser, at the same time as a second portion of the charged particles emitted from the sample may be received through the second entrance aperture of the energy analyser. This allows for simultaneous detection of charged particles at both the first and the second detector.

Preferably, the first entrance aperture of the toroidal capacitor type electrostatic energy analyser is displaced by an azimuthal angle from the second entrance aperture of the toroidal capacitor type electrostatic energy analyser. The first entrance aperture may be arranged at the same radial distance as the second entrance aperture. Alternatively, the first and the second entrance aperture may be at a greater or lesser distance compared to each other. As such, the first and second entrance aperture may be radially displaced compared to each other (as well as, or instead of, displaced by an azimuthal angle).

The toroidal capacitor type electrostatic energy analyser may further comprise a first and a second exit aperture. Charged particles traversing the first trajectory through the toroidal capacitor type electrostatic energy analyser may pass through the first exit aperture, and charged particles traversing the second trajectory through the toroidal capacitor type electrostatic energy analyser may pass through the second exit aperture. The first exit aperture may be displaced by an azimuthal angle and/or radially displaced from the second exit aperture.

Optionally, the first and the second exit apertures comprise a first and a second exit slit, respectively. The first and second exit slits may have a length in a direction perpendicular to the radial direction of the exit plane of the toroidal capacitor type electrostatic energy analyser, and the length of the second exit slit may be greater than the length of the first exit slit. Beneficially, the size (or length) of the exit slit can be selected differently for the first and second exit aperture, so as to be optimised for the type of measurement being performed on charged particles passing along either the first or the second trajectory.

Preferably, prior to being received at the toroidal capacitor type electrostatic energy analyser, the charged particles emitted from the sample may be directed along a first path towards the first entrance aperture, and/or along a second path towards the second entrance aperture. The charged particles may be directed by a deflector assembly, as described in more detail above.

Preferably, directing charged particles emitted from the sample comprises directing charged particles emitted from a sample away from the first path and along the second path. Alternatively, charged particles emitted from a sample may be directed away from the second path and along the first path. The deflection of charged particles eventually incident at a detector for spectroscopy (in other words, used in a spectroscopy measurement) may be preferable to the deflection of charged particles eventually incident at a detector for imaging (in other words, used in an imaging measurement). This is because deflection may increase aberration of a measured image.

Optionally, charged particles emitted from the sample may be deflected from the first path; and, subsequently, the deflected charged particles may be further deflected towards the second entrance aperture of the toroidal capacitor type electrostatic energy analyser. In other words, the charged particles may undergo more than one deflection, in order to be correctly re-directed to a particular entrance aperture at the energy analyser.

Preferably, prior to receiving charged particles emitted from a sample at a toroidal capacitor type electrostatic energy analyser, the method further comprises passing the charged particles through rotator optics. The rotator optics first shape the beam so as to provide a rectangular or ribbon cross-section for the charge particle beam. The rotator optics then further rotate all angles of the resulting rectangular beam so that angles associated with the narrow dispersive direction are subsequently in the wide-angle accepting non-dispersive direction of the energy analyser. Beneficially, use of rotator optics greatly increases spectroscopy sensitivity through the energy analyser.

Optionally, passing the charged particles through rotator optics occurs subsequent to directing of the charged particles along a first path or along a second path, and the rotator optics is positioned on the second path. Ideally, the rotator optics are arranged on a path that eventually is incident at a detector for spectroscopy (in other words, ideally the charged particles passed through the rotator optics are used for a spectroscopy measurement). This is because of the increased sensitivity for the spectroscopy measurement provided by the rotator optics, and further as a result of the increased aberration caused to a measured image if the charged particles used for an image measurement are passed through rotator optics.

The method may further comprise passing charged particles emitted from the sample through a common input lens. The common input lens may be used to collimate the charged particles received from the sample.

The method may further comprise passing charged particles on the first path through a further input lens. In other words, after passing through the deflector assembly, an "undeflected" beam may be passed through a further input lens, in order to collimate the charged particles prior to entry to the energy analyser through the first entrance aperture. Alternatively, a further input lens could be arranged on the second pathway, prior to the second entrance aperture. More than one further input lens could be used, for instance a first further input lens may be arranged on the first path, and a second further input lens may be arranged on the second path.

Preferably, the method comprises passing charged particles received from the energy analyser though an output lens before being incident at either the first or the second detector. In other words, an output lens is arranged between an exit of the energy analyser and the first or the second detector. The output lens may be used to focus the charged particles on to the detection surface of the detector. The use of an output lens may be especially advantageous when used in conjunction with a detector for imaging.

In a third aspect, there is described an X-Ray Photoelectron Spectrometer comprising the apparatus as described above, and/or configured to perform the method as described above.

Further illustrative examples are described by the following numbered clauses:

1. An apparatus for characterisation of a sample, comprising:
   a first detector for imaging or spectroscopy;
   a second detector for imaging or spectroscopy; and
   a toroidal capacitor type electrostatic energy analyser;
   the toroidal capacitor type electrostatic energy analyser comprising a first and a second entrance aperture arranged such that charged particles emitted from a sample and passing through the first entrance aperture traverse a first trajectory through the toroidal capacitor type electrostatic energy analyser to be incident at the first detector, and charged particles emitted from a sample and passing through the second entrance aperture traverse a second trajectory through the toroidal capacitor type electrostatic energy analyser to be incident at the second detector.

2. The apparatus of clause 1, wherein the first detector is for imaging, and the second detector is for spectroscopy.

3. The apparatus of clause 1 or clause 2, wherein the first entrance aperture to the toroidal capacitor type electrostatic energy analyser is displaced by an azimuthal angle from the second entrance aperture to the toroidal capacitor type electrostatic energy analyser.

4. The apparatus of any one of clause 1 to 3, further comprising a deflection assembly, arranged to direct charged particles emitted from the sample along a first ion path towards the first entrance aperture and/or along a second ion path towards the second entrance aperture of the toroidal capacitor type electrostatic energy analyser.

5. The apparatus of clause 4, wherein the deflection assembly is arranged to direct charged particles emitted from a sample away from the first ion path and along the second ion path.

6. The apparatus of clause 5, wherein the deflection assembly comprises a first deflector arranged to deflect the charged particles from the first ion path, and a second deflector arranged to further deflect the deflected charged particles towards the second entrance aperture of the toroidal capacitor type electrostatic energy analyser.

7. The apparatus of any one of clauses 4 to 6, further comprising a rotator optics positioned on the first ion path or the second ion path, arranged such that charged particles pass through the rotator optics prior to passing through the first or the second entrance aperture, respectively.

8. The apparatus of clause 7, wherein the rotator optics is arranged on the second ion path.

9. The apparatus of any preceding clause, wherein the toroidal capacitor type electrostatic energy analyser further comprises a first and a second exit aperture, arranged such that charged particles traversing the first trajectory through the toroidal capacitor type electrostatic energy analyser pass through the first exit aperture, and charged particles traversing the second trajectory through the toroidal capacitor type electrostatic energy analyser pass through the second exit aperture.

10. The apparatus of clause 9, wherein the first and the second exit apertures comprise a first and a second exit slit, respectively, and wherein the first and second exit slits have a length in a direction perpendicular to the radial direction of the exit plane of the toroidal capacitor type electrostatic energy analyser, and wherein the length of the second exit slit is greater than the length of the first exit slit.

11. A method of characterisation of a sample, comprising:
    receiving at a toroidal capacitor type electrostatic energy analyser charged particles emitted from a sample, wherein the toroidal capacitor type electrostatic energy analyser comprises a first and a second entrance aperture and the received charged particles pass through the first or the second entrance aperture on entry to the toroidal capacitor type electrostatic energy analyser; and
    traversing the charged particles received through the first entrance aperture on a first trajectory through the electrostatic analyser to be incident at a first detector for imaging or spectroscopy, and/or traversing the charged particles received through the second entrance aperture on a second trajectory through the electrostatic analyser to be incident at a second detector for imaging or spectroscopy.

12. The method of clause 11, wherein the first detector is for imaging, and the second detector is for spectroscopy.

13. The method of clause 11 or clause 12, wherein a portion of the charged particles traverse the first trajectory simultaneously with a portion of the charged particles traversing the second trajectory.

14. The method of any one of clauses 11 to 13, wherein the first entrance aperture of the toroidal capacitor type electrostatic energy analyser is displaced by an azimuthal angle from the second entrance aperture of the toroidal capacitor type electrostatic energy analyser.

15. The method of any one of clauses 11 to 14, wherein prior to receiving at the toroidal capacitor type electrostatic energy analyser the charged particles emitted from the sample, the method further comprises:
    directing charged particles emitted from the sample along a first ion path towards the first entrance aperture, and/or along a second ion path towards the second entrance aperture.

16. The method of clause 15, wherein directing charged particles emitted from the sample comprises directing charged particles emitted from a sample away from the first ion path and along the second ion path.

17. The method of clause 16, further comprising:
    deflecting charged particles emitted from the sample from the first ion path; and
    subsequently, deflecting the deflected charged particles towards the second entrance aperture of the toroidal capacitor type electrostatic energy analyser.

18. The method of any one of clauses 11 to 17, wherein prior to receiving charged particles emitted from a sample at a toroidal capacitor type electrostatic energy analyser, the method further comprises:
    passing the charged particles through a rotator optics.

19. The method of clause 18, when dependent on any one of clauses 15 to 17, wherein the passing the charged particles through a rotator optics is subsequent to directing of the charged particles along a first ion path or along a second ion path, and wherein the rotator optics is positioned on the second ion path.

20. The method of any one of clauses 11 to 19, wherein the toroidal capacitor type electrostatic energy analyser further comprises a first and a second exit aperture, and wherein charged particles traversing the first trajectory through the toroidal capacitor type electrostatic energy analyser pass through the first exit aperture, and charged particles traversing the second trajectory through the toroidal capacitor type electrostatic energy analyser pass through the second exit aperture.

21. The method of clause 20, wherein the first and the second exit apertures comprise a first and a second exit slit, respectively, and wherein the first and second exit slits have a length in a direction perpendicular to the radial direction of the exit plane of the toroidal capacitor type electrostatic energy analyser, and wherein the length of the second exit slit is greater than the length of the first exit slit.

22. An X-Ray Photoelectron Spectrometer comprising the apparatus of any one of clauses 1 to 10.

LIST OF FIGURES

The present invention will now be described, by way of example only, with reference to the accompanying drawings, in which.

In the drawings, like parts are denoted by like reference numerals. The drawings are not drawn to scale.

DETAILED DESCRIPTION OF SPECIFIC EMBODIMENTS OF THE INVENTION

Figure 1:
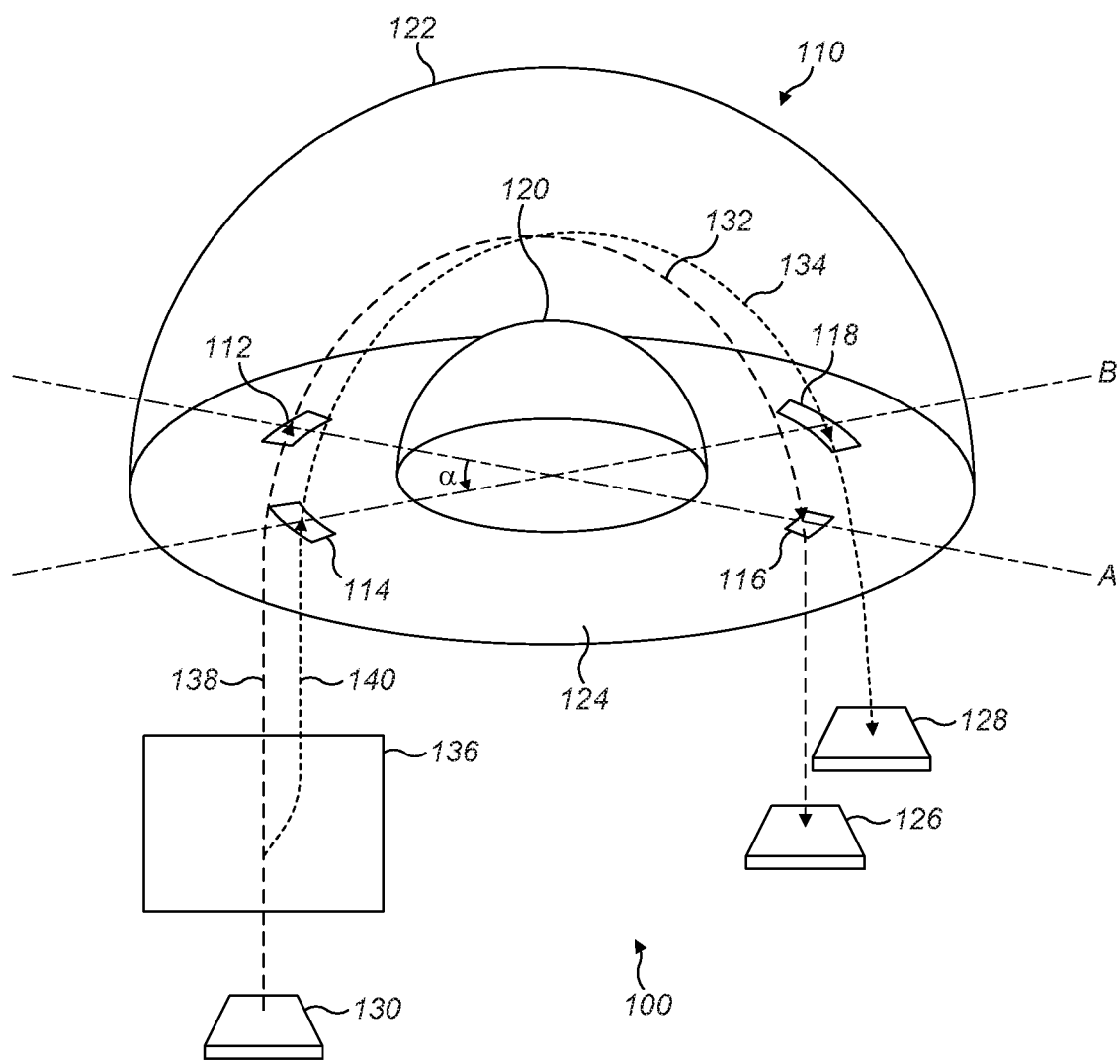
FIG. 1 is a perspective, simplified view of an apparatus for characterisation of a sample, and more specifically for spectroscopy and imaging of the sample surface.

FIG. 1 shows a simplified, perspective view of an apparatus 100 for characterisation of a sample, and more particularly for spectroscopy and imaging of a sample surface. In FIG. 1 a toroidal capacitor type electrostatic energy analyser 110 ("analyser") is shown having a first 112 and a second 114 entrance aperture. The analyser further comprises a first 116 and a second 118 exit aperture. In the example illustrated in FIG. 1, the first 112 and second 114 entrance apertures and the first 116 and second 118 exit apertures are slits, being smaller in the radial direction than in the direction perpendicular to the radius, when considered in the entrance and exit plane 124 (or base plane) of the analyser 110. The first entrance aperture 112 is arranged radially opposite to the first exit aperture 116, and the second entrance aperture 114 is arranged radially opposite the second exit aperture 118. The second entrance aperture 114 is displaced by an azimuthal angle, a, from the first entrance aperture 112 (when considered in the entrance and exit plane). The second exit aperture 118 is also displaced by the same azimuthal angle, a, from the first exit aperture 116.

In this example, the analyser 110 is an electrostatic concentric hemispherical analyser (CHA). As such, the analyser comprises an inner 120 and an outer 122 hemisphere that are concentric, defining a cavity therebetween through which charged particles can be transmitted. Particles moving on a trajectory through the cavity, received at the first entrance aperture 112 and leaving at the first exit aperture 116, for example, undergo a full 180° deflection.

A first detector 126 is arranged to be aligned with the first exit aperture 116, such that charged particles leaving the analyser 110 through the first exit aperture 116 would be incident at the first detector 126. In this particular example, the first detector 126 is suitable for imaging ("imaging detector"). For example, the first detector 126 may be a microchannel plate detector, wherein the received data collected at the detector is processed to generate an image. Data is processed using a computer (not shown). The computer comprises: a storage medium, a memory, a processor, and input and output interfaces, which are operatively linked together.

A second detector 128 is arranged to be aligned with the second exit aperture 118, such that charged particles leaving the analyser 110 through the second exit aperture 118 would be incident at the second detector 128. In this particular example, the second detector 128 is suitable for spectroscopy ("spectroscopy detector"). For example the second detector 128 also may be a microchannel plate detector. According to known methods in the art, this may be used to determine the energy of the particles, as a consequence of the position of the particles received at the second detector.

In use, charged particles emitted from a sample 130 and received through the first entrance aperture 112 pass through the analyser 110 on a first trajectory 132 and undergo a full 180° deflection, exiting the cavity of the analyser 110 through the first exit aperture 116. The charged particles are incident at the first detector 126 (or imaging detector). Similarly, charged particles emitted from the sample 130 and received through the second entrance aperture 114 pass through the analyser 110 on a second trajectory 134, different to the first trajectory, and exit the cavity of the analyser 110 through the second exit aperture 118. These charged particles, now dispersed according to their energy, are then incident at the second detector 128 (or spectroscopy detector).

As can be seen from FIG. 1 the first trajectory 132 and the second trajectory 134 are azimuthally rotated compared to each other. In this way, a single analyser 110 can be used to provide two trajectories for charged particles. In this example, this configuration allows both imaging and spectroscopy to take place using the described apparatus. Beneficially, the entrance 112, 114 and exit apertures 116, 118, as well as the detectors 126, 128, associated with each trajectory 132, 134 can be optimised for different modes of operation.

In addition, FIG. 1 shows a deflection assembly 136. The deflection assembly 136 is arranged on the pathway of charged particles between the sample 130 and the entrance apertures 112, 114 of the analyser 110. The deflection assembly 136 may comprise one or more electrostatic lenses or deflectors, which can be used to direct (or deflect) charged particles. In the example of FIG. 1, charged particles are emitted from the sample 130 on a first pathway 138 towards the first entrance aperture 112 of the analyser 110, unless redirected by the deflection assembly 136. In use, the deflection assembly 136 controllably redirects (or deflects) charged particles from the first pathway 138 and to instead move along a second pathway 140 towards the second entrance aperture 114 of the analyser 110. In this way, the deflection assembly 136 can be used to select the transmission of charged particles through the analyser 110 on either the first 132 or the second trajectory 134, and consequently whether the charged particles are received at the first 126 or the second 128 detector. In the present example, this allows selection between the apparatus 100 being used in an imaging or a spectroscopy mode. A controller (not shown in FIG. 1) can be used to control the deflection assembly 136.

Figure 2:
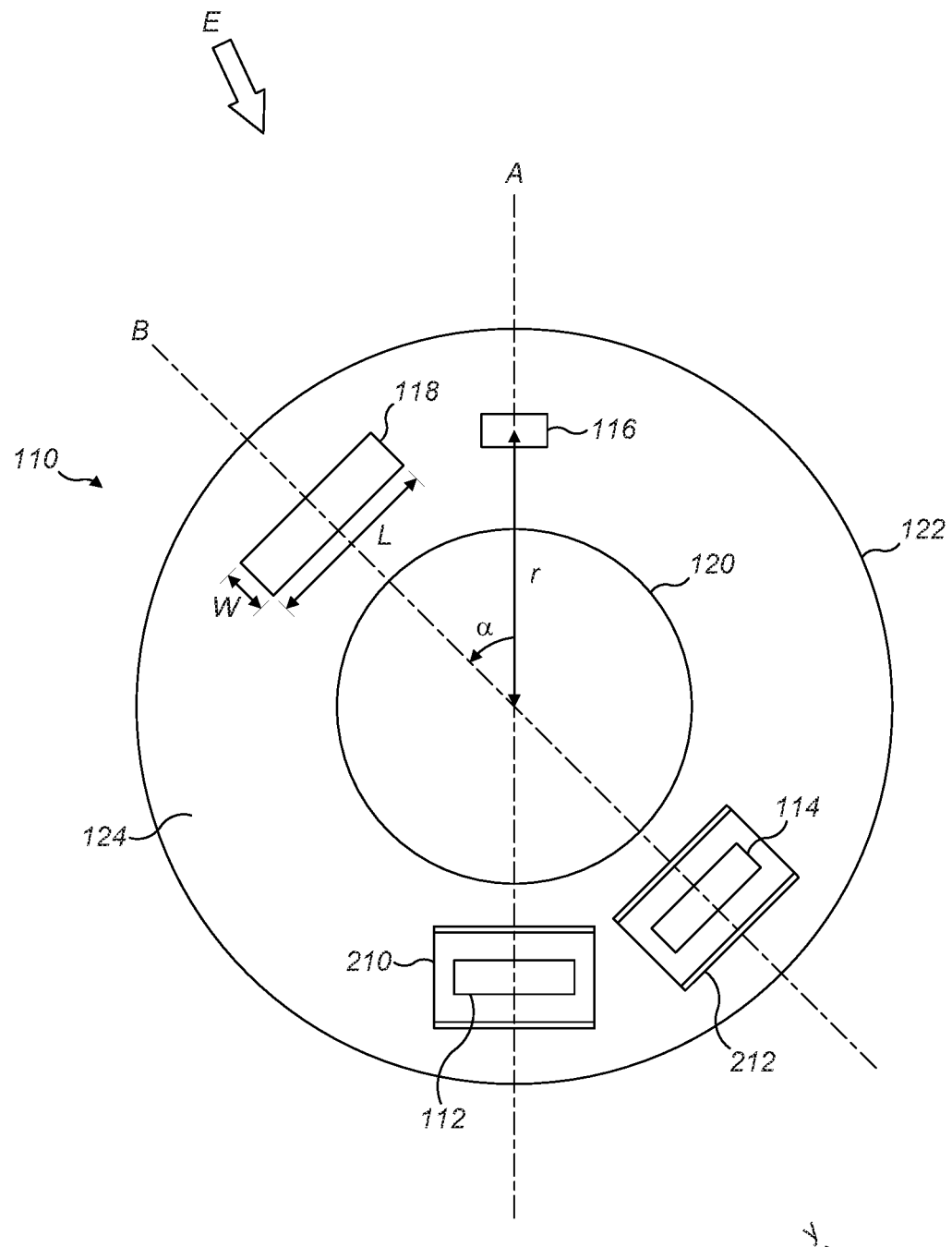
FIG. 2 is a cross-sectional, schematic view of the apparatus for characterisation of a sample, and more specifically for spectroscopy and imaging of the sample surface.

FIG. 2 shows a cross-sectional view of the apparatus of FIG. 1, and includes more detail. Specifically, FIG. 2 shows a cross-sectional view of the entrance and exit plane 124 (or base plane) of the analyser 110. This plane is also marked as plane C in FIGS. 3 and 4, as described below, but is shown in a simplified form in FIG. 2.

As shown in FIG. 2, the inner hemisphere 120 of the analyser is arranged at the centre of the base plane 124, and the first 112 and second 114 entrance aperture and the first 116 and second 118 exit aperture are arranged on the portion of the base plane 124 concentric to the inner hemisphere 120. As noted above, the first entrance aperture 112 is arranged radially opposite the first exit aperture 116, and the second entrance aperture 114 is arranged radially opposite the second exit aperture 118. In the illustrated example, the centre of the first 112 and second 114 entrance aperture and the first 116 and second 118 exit aperture are each arranged at a radial distance, r, from the centre of the base plane 124. The second entrance aperture 114 (centre of the aperture) is arranged at an azimuthal angle, a, from the first entrance aperture 112 (centre of the aperture). Similarly, the second exit aperture 118 (centre of the aperture) is arranged at the same azimuthal angle, a, from the first exit aperture 116 (centre of the aperture).

As demonstrated within FIG. 2, the entrance 112, 114 and exit 116, 118 apertures of this example are slits, being smaller in the radial direction (the width, W) than in the direction perpendicular to the radius (the length, L). As shown in FIG. 2, the length and width of the first entrance slit 112 may be the same or similar to the dimensions of the second entrance slit 114. However, in the example of FIG. 2, the dimensions of the first 116 and second 118 exit slits are different. Specifically, the length of the first exit slit 116 (forming part of the trajectory 132 used in the imaging mode of this example of the apparatus) is less than the length of the second exit slit 118 (forming part of the trajectory 134 used in the spectroscopy mode of this example of the apparatus).

This difference in the dimensions of the first 116 and second 118 exit slits has particular advantages, as the slit dimensions can be optimised for the particular measurement required via the trajectory associated with particles leaving the analyser at each aperture. For example, here the slit dimensions are optimised for either the imaging or spectroscopy mode. For instance, in FIG. 2 the slit length is made larger (for example, 5 mm) for the spectroscopy mode, in order to improve the resolution of the measured spectra by allowing passage of a greater portion of the charged particle beam. However, the slit is made smaller in length (for example, 1 mm) for the imaging mode, in order to reduce aberration. Such a configuration for the first and second exit apertures (and so the consequent benefits) is only possible due to the novel configuration of the analyser of the present invention. In prior art systems where an exit slit from the analyser is shared for use in both measurement modes, a compromise of the dimensions of the slit had to be made, thereby reducing the quality of both the imaging and spectroscopy data obtained.

FIG. 2 additionally shows alpha plates 210, 212 at the first and second entrance apertures of the analyser. Although the alpha plates 210, 212 do not form an essential component of the present invention, they are advantageous. The alpha plates 210, 212 are used to ensure very high energy resolution by limiting the acceptance angle of charged particles entering the analyser. Furthermore, alpha plates may serve as a 'fringe field corrector' device at the boundaries of the electrostatic field generated between the hemispheres of the analyser. In particular, although the field is theoretically linear and uniform between the hemispheres, in practice the field may not be entirely uniform at the edges or boundaries. Beneficially, in the presently described system, alpha plates may be fitted to a specific input aperture so as to have characteristics optimised depending on their use in an imaging or spectroscopy mode.

Figure 3:
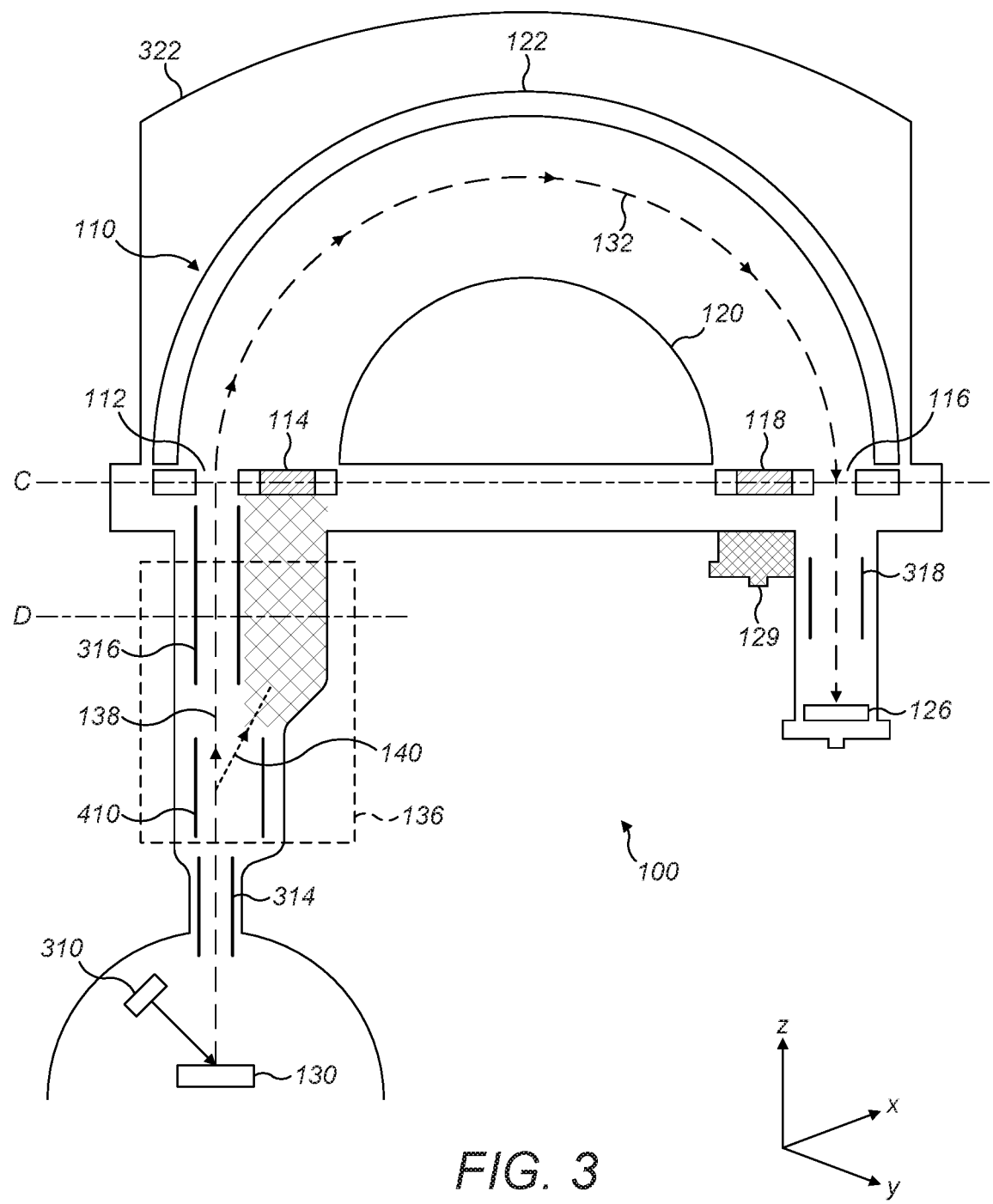
FIG. 3 is a cross-sectional, schematic view along plane A of the apparatus of FIGS. 1 and 2.

FIG. 3 illustrates a cross-section through the apparatus 100 of FIG. 1, with additional detail. The cross-section shown in FIG. 3 represents the plane A through the apparatus 100, as denoted in FIG. 1. The cross-section of FIG. 3 demonstrates the first trajectory 132, which in this specific example is used in an imaging mode of the apparatus 100. The line C in FIG. 3 represents the exit and entrance plane 124 of the analyser 110, which is the plane shown in FIG. 2.

As described above in relation to FIGS. 1 and 2, FIG. 3 shows an electrostatic hemispherical analyser 110 ("analyser"), having an inner 120 and outer 122 hemisphere, defining a cavity in between through which charged particles are transmitted for analysis. The analyser 110 further comprises a first 112 and a second 114 entrance aperture and a first 116 and a second 118 exit aperture. A first detector 126 (in this example, the "imaging detector") is arranged aligned with the first exit aperture 116. The first entrance 112 and exit 116 apertures are within the cross-sectional plane A illustrated in FIG. 3.

As discussed above with reference to FIGS. 1 and 2, the second entrance 114 and exit 118 apertures of the analyser 110 are each rotated by an azimuthal angle, a, from the first entrance 112 and exit 116 aperture, respectively. As such, the second entrance 114 and exit 118 apertures are not in plane A. Nevertheless, these apertures (and some features associated with the second trajectory 134 though the analyser 110, including second detector chamber 129) are shown in FIG. 3 for illustrative purposes only. It is noted that the position of these features are not a true representation.

In the specific example of FIG. 3, the configuration of the apparatus 100 provides an imaging mode on the first trajectory. In use, a radiation source 310 (such as an X-ray source of predetermined wavelength, i.e. monochromatic) is used to irradiate the surface of a sample 130. Charged particles (for instance, photoelectrons) consequently are emitted from the surface of the sample 130, towards the analyser. The emitted charged particles are passed through a deflection assembly 136, which is arranged on the pathway of the charged particles between the sample 130 and the analyser 110. In the described imaging mode, the particles are not redirected when passing through the deflection assembly 136. Instead, the charged particles move directly on the first pathway 138 towards the first entrance aperture 112. Once inside the analyser 110, the charged particles pass on a first trajectory 132 through the analyser 110 and through the first exit aperture 116, to be incident at the first detector 126 (or imaging detector).

FIG. 3 shows various charged particle optics. For instance, a first deflector 410 forms part of the deflection assembly 136. The first deflector 410 does not redirect or deflect charged particles in the presently described imaging mode. As such, the first deflector 410 (and the whole deflection assembly 136) is discussed in more detail below, with reference to FIG. 4.

FIG. 3 additionally shows a common input lens 314, placed upstream of the deflection assembly 136, and a first pathway input lens 316, placed downstream of the deflection assembly 136. The input lenses 314, 316 are used to collimate the beam of charged particles, and control the angle of input of the charged particle beam into the analyser 110. The common input lens 314 can be used to manipulate the charged particles when the apparatus 100 is used in either or both of the imaging or spectroscopy mode described herein. However, the first pathway input lens 316 is only used for collimation of the charged particles on the first pathway 138 (which have not been redirected by the deflection assembly 136). In other words, the first pathway input lens 316 is used within the imaging mode of the apparatus only in the present example.

Further charged particle optics are provided at the output of first trajectory 132. In particular, a first pathway output lens 318 is arranged between the first exit aperture 116 and the first detector 126 (or imaging detector). Charged particles exiting the analyser 110 through the first exit aperture 116 are passed through the first pathway output lens 318 before being incident at the first detector 126. The output lens 318 is used to focus or collimate the charged particle beam as required.

The complete apparatus 100, including the analyser 110, the detectors 126, 128, the sample 130, the deflection assembly 136, and all the charged particle optics are arranged within a vacuum chamber 322.

Beneficially, the deflector assembly discussed above with respect to FIGS. 1 to 3 may result in a first and second pathway which are parallel when travelling between the deflector and the entrance slits. Where this is the case and where the first and second entrance slits are also in the same plane of an analyser (for instance, an electrostatic hemispherical analyser), the charge particle beams may enter the entrance slits perpendicular to the entrance plane. This can help to prevent spread and refraction of the electron beam upon entry to the analyser.

Figure 4:
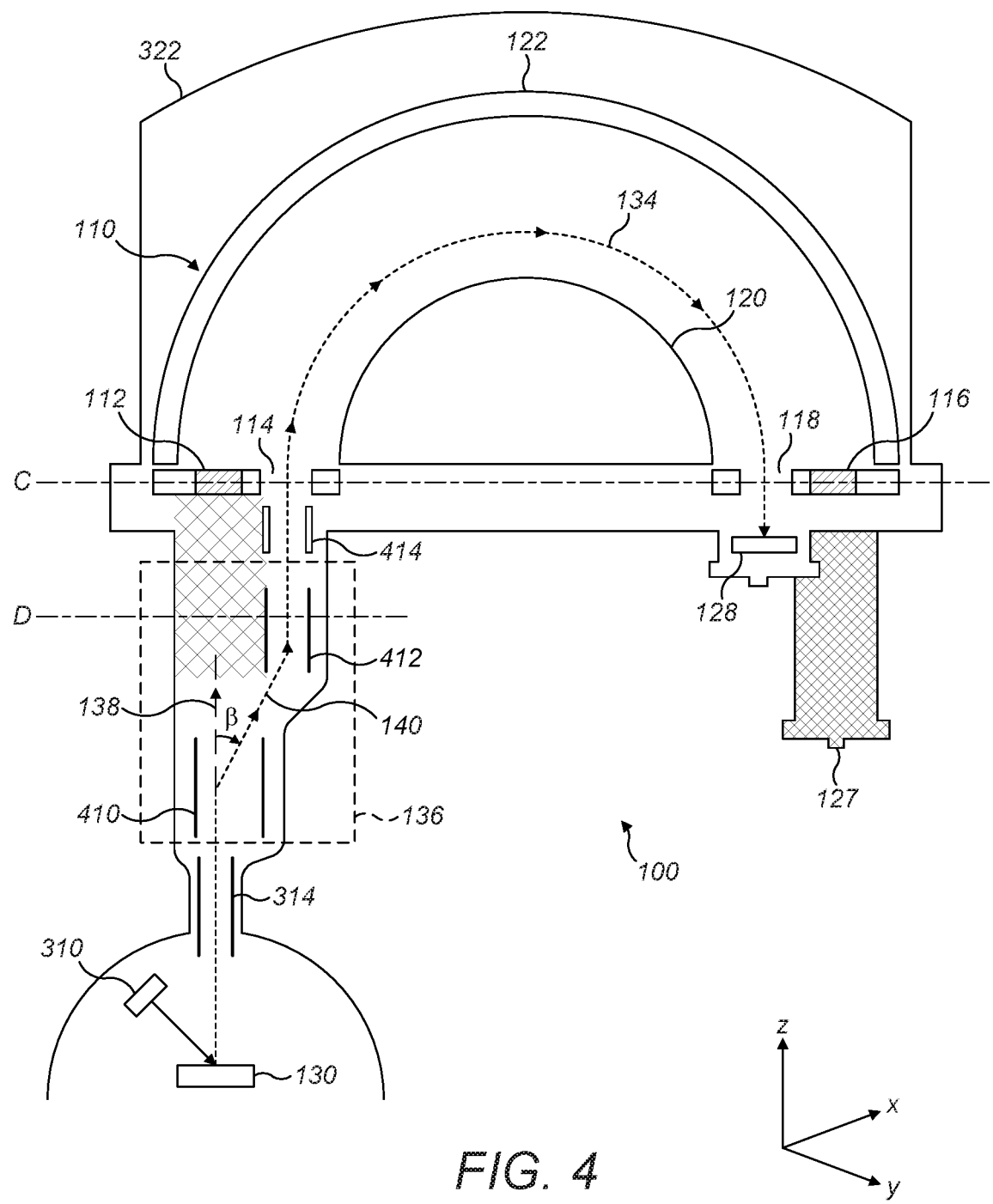
FIG. 4 is a cross-sectional, schematic view along plane B of the apparatus of FIGS. 1 and 2.

FIG. 4 illustrates a cross-section through the apparatus 100 of FIG. 1, with additional detail. The cross-section shown in FIG. 4 represents the plane B through the apparatus 100, as denoted in FIG. 1. The cross-section of FIG. 3 demonstrates the second trajectory 134, which in this specific example is used in the spectroscopy mode of the apparatus 100. The line C in FIG. 4 represents the exit and entrance plane 124 of the analyser 110, which is the plane shown in FIG. 2.

As described above in relation to FIGS. 1, 2 and 3, FIG. 4 shows an electrostatic hemispherical analyser 110 ("analyser"), having an inner 120 and outer 122 hemisphere, defining a cavity in between through which charged particles are transmitted for energy analysis. The analyser 110 further comprises a first 112 and a second 114 entrance aperture and a first 116 and a second 118 exit aperture. A second detector 128 (in this example, the "spectroscopy detector") is arranged aligned with the second exit aperture 118. Second entrance 114 and exit 118 apertures are within the cross-sectional plane B illustrated in FIG. 4.

As discussed above with reference to FIGS. 1 and 2, the first entrance 112 and exit 116 apertures are each rotated by an azimuthal angle, a, compared to the second entrance 114 and exit 118 aperture, respectively. Accordingly, the first entrance 112 and exit 116 apertures are not in plane B. Nevertheless, these apertures (and some features associated with the first trajectory 132 though the analyser 110, including first detector chamber 127) are shown in FIG. 4 for illustrative purposes only. It is noted that the position of these features are not a true representation.

In the specific example of FIG. 4, the apparatus 100 is shown in a configuration in which the second trajectory provides a spectroscopy mode. In use, a radiation source 310 (such as an X-ray source of predetermined wavelength) is used to irradiate the surface of a sample 130. Charged particles (for instance, photoelectrons) consequently emitted from the surface of the sample 130 are emitted towards the analyser. The charged particles are passed through a deflection assembly 136, which is arranged on the pathway of charged particles between the sample 130 and the analyser 110. In the described spectroscopy mode, the charged particles are deflected from their initial pathway by the deflection assembly 136, and instead are directed on a second pathway 140 towards the second entrance aperture 114 of the analyser 110. The charged particles then enter the analyser 110 through the second entrance aperture 116. Once inside the analyser 110, the charged particles are passed on the second trajectory 134 to the second exit aperture 118. After passing through the second exit aperture 118, the charged particles are incident at the second detector 128 (or spectroscopy detector). Whilst moving through the analyser 110, the charged particles are dispersed according to their energy, and as such, the position of the charged particles when incident at the surface of the second detector 128 can be used to determine the charged particles' energy (and so various characteristics of the sample surface).

As noted above, in the described spectroscopy mode the charged particles emitted from the sample 130 are deflected, or redirected, at deflection assembly 136 prior to entry to the analyser 110 though the second entrance aperture 114. The deflection assembly comprises at least two deflector arrangements, or deflectors. For instance, FIG. 4 shows a first deflector 410, which is used to deflect charged particles emitted from the sample at an angle, β, from their original direction. A second deflector 412 is then used to deflect the deflected charged particles once again (by an opposite angle, −β), such that the charged particles are directed along a second pathway 140 towards the second entrance aperture 114. In the particular example of FIG. 4, the angle, β, is 45°.

Figure 5:
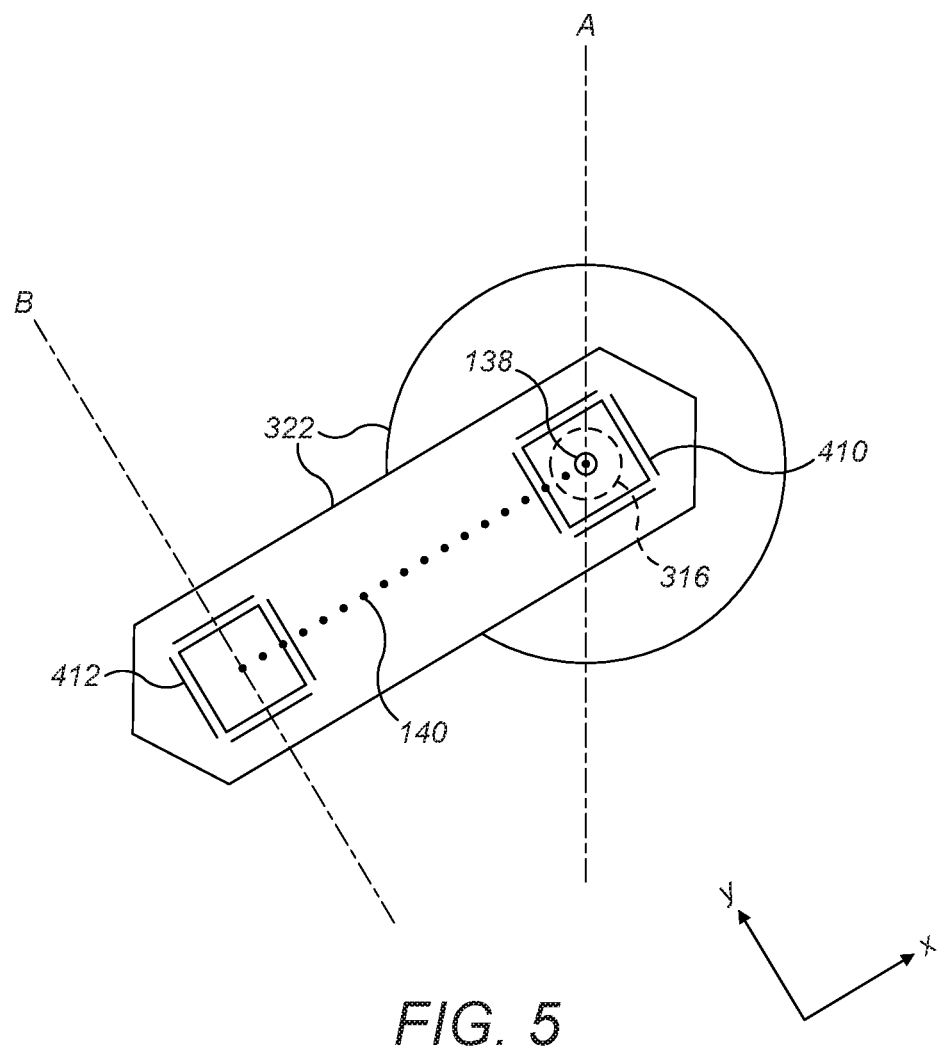
FIG. 5 is a cross-sectional, schematic view along plane D of the apparatus of FIGS. 1 and 2.

FIG. 5 shows the deflection assembly 136 of FIG. 4 in a plan view at the cross-section D marked on FIG. 4. FIG. 5 shows first 410 and second 412 deflectors, first pathway input lens 316, and the vacuum chamber 322 which houses the various components. In this view, the first pathway 138 for the charged particles (in which particles are not deflected, as used in the above-described imaging mode) is directly out of the page, and the second pathway 140 for the charged particles (as used in the above-described spectroscopy mode) is shown as first processing across the page (after deflection from first deflector 410) and then being directly out of the page (after deflection from the second deflector 412). In this specific example, the first 410 and second 412 deflectors are comprised of electrostatic field plates, although other types of deflector (such as electrostatic multi-poles or magnetic deflectors could be used).

Control of the deflection assembly 136 (and more specifically, first deflector 410 and second deflector 412) allows selection of either a first or second pathway for charged particles as they pass through the apparatus. As such, the deflector assembly 136 can be used to select an operation mode in some configurations of the apparatus. For instance, the apparatus 100 can be selectively operable in either an imaging mode discussed above with reference to FIG. 3, or in a spectroscopy mode discussed here with reference to FIG. 4. A controller for control of the deflection assembly 136 can be connected via typical means (although the controller is not shown in FIG. 4).

Returning to FIG. 4, this further shows rotator optics 414, arranged on the second pathway, between the deflection assembly 136 and the second entrance aperture 114. The rotator optics 414 comprise charged particle optics for shaping the charged particle beam and rotating the momenta of the charged particles so as to be transverse to the direction of the charged particle beam.

Figure 6A:
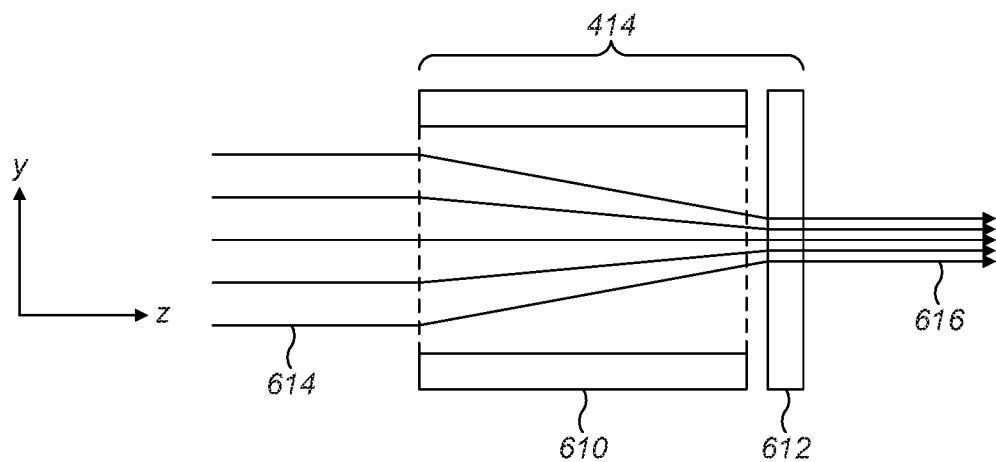
FIGS. 6A and 6B are schematic diagrams of the function of the described rotator optics.
Figure 6B:
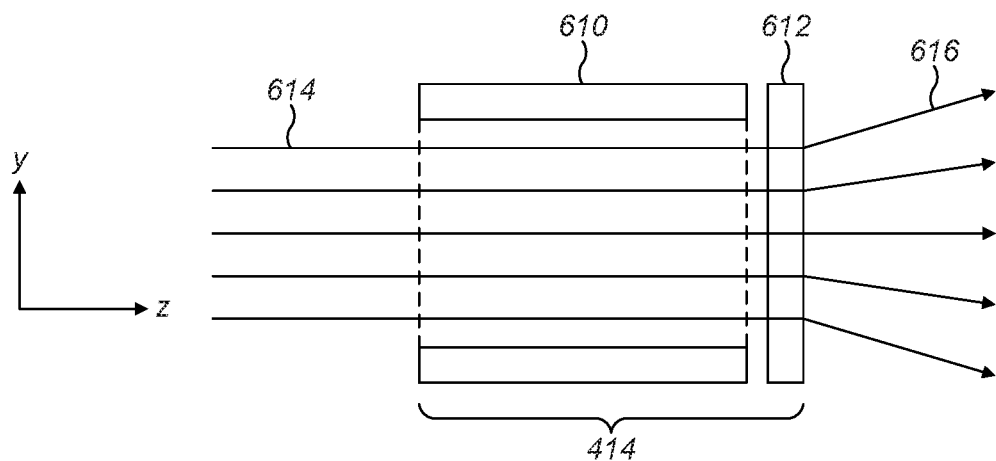

FIGS. 6A and 6B show the function of the rotator optics 414 in greater detail. FIG. 6A shows the function of the rotator optics 414 in the y-direction of the beam, and FIG. 6B shows the function of the rotator optics 414 in the x-direction of the beam. Prior to the rotator optics 414, the cross-section of the input beam 614 is assumed to be approximately equal in size in both the x-direction and the y-direction. Upon entry to the rotator optics 414, a lens system 610 compresses (narrows) the beam in the y-direction, which is the direction of subsequent dispersion within the energy analyser 110. The beam is accordingly comparatively wider in the x-direction, which is the direction of non-dispersion within the energy analyser 110. Accordingly, the beam has a rectangular cross-section.

Next, a rotator lens 612 rotates all angles of the momenta of particles in the charged particle beam such that the momenta is in the wider x-direction. This causes further elongation of the output beam 616 in the non-dispersive x-direction of the output beam upon exit from the rotator optics 414. Accordingly, the elongated beam direction is now in the wide-angle-accepting, non-dispersive direction of the hemispherical analyser. In other words, the rotator lens 612 essentially eliminates momenta of particles in the direction transverse to the wider x-direction entering the analyser.

As a consequence of using this type of rotator optics 414, spectroscopy sensitivity can be increased dramatically (by approximately three times). Although the function of the rotator optics 414 could be achieved in various ways, the rotator optics within FIG. 4 may be the combined Einzel lens and magnetic rotator lens arrangement of the type described in U.S. Pat. No. 4,554,457. Thus, the lens system 610 can be an electrostatic lens, preferably an Einzel lens, and/or the rotator lens 612 can be a magnetic rotator lens. In some embodiments, as each energy is sequentially analysed, the magnetic rotator can be programmed with a current (magnetic field) to bring the momenta of particles of that energy to the optimum angular rotation, generally in the wider x-direction, to allow the greatest flux through the analyser.

The configuration of the apparatus discussed above in FIGS. 1 to 5 allows provision of two separate trajectories through the energy analyser, and two respective separate pathways through the apparatus overall. As a result, the characteristics of the apparatus (for instance, analyser aperture or slit size, input and output lenses, and use of a magnetic rotator) can be optimised to the specific purpose of a given pathway through the apparatus.

With specific reference to the apparatus shown in FIGS. 3 and 4, compared to prior art systems in which a shared exit aperture from the analyser is used in both imaging and spectroscopy mode, the present invention allows use of a narrower exit aperture on a first pathway used for the imaging mode. This can beneficially reduce the count rate, and so provides a resultant image with fewer aberrations.

Further benefits are obtained in the spectroscopy mode. In the second pathway used in a spectroscopy mode, a larger exit aperture can be used (compared to the prior art, and compared to the exit aperture in the imaging mode). In spectroscopy mode, a higher count rate is preferred, and this can be obtained using a larger length for the exit slit. In particular, a higher pass energy is provided for a given resolution at the spectrometry detector.

In addition, the novel configuration of the described examples allows implementation of rotator optics (and more specifically, a magnetic rotator lens) in the spectroscopy mode pathway. The rotator optics significantly improve the count rate obtained, and so consequently the spectroscopy sensitivity (typically, by around three times compared to some prior art systems). Use of rotator optics such as those described would not be suitable within a pathway through the apparatus that is common to both an imaging and spectroscopy mode, because the imaging mode is very sensitive to distortion by obstructions, and by magnetic or electrostatic fields. Overall, the ability to use both a larger exit slit and the rotator optics in the pathway for spectroscopy provides a significant increase in the sensitivity of the spectroscopy measurement in the described apparatus.

Figure 7:
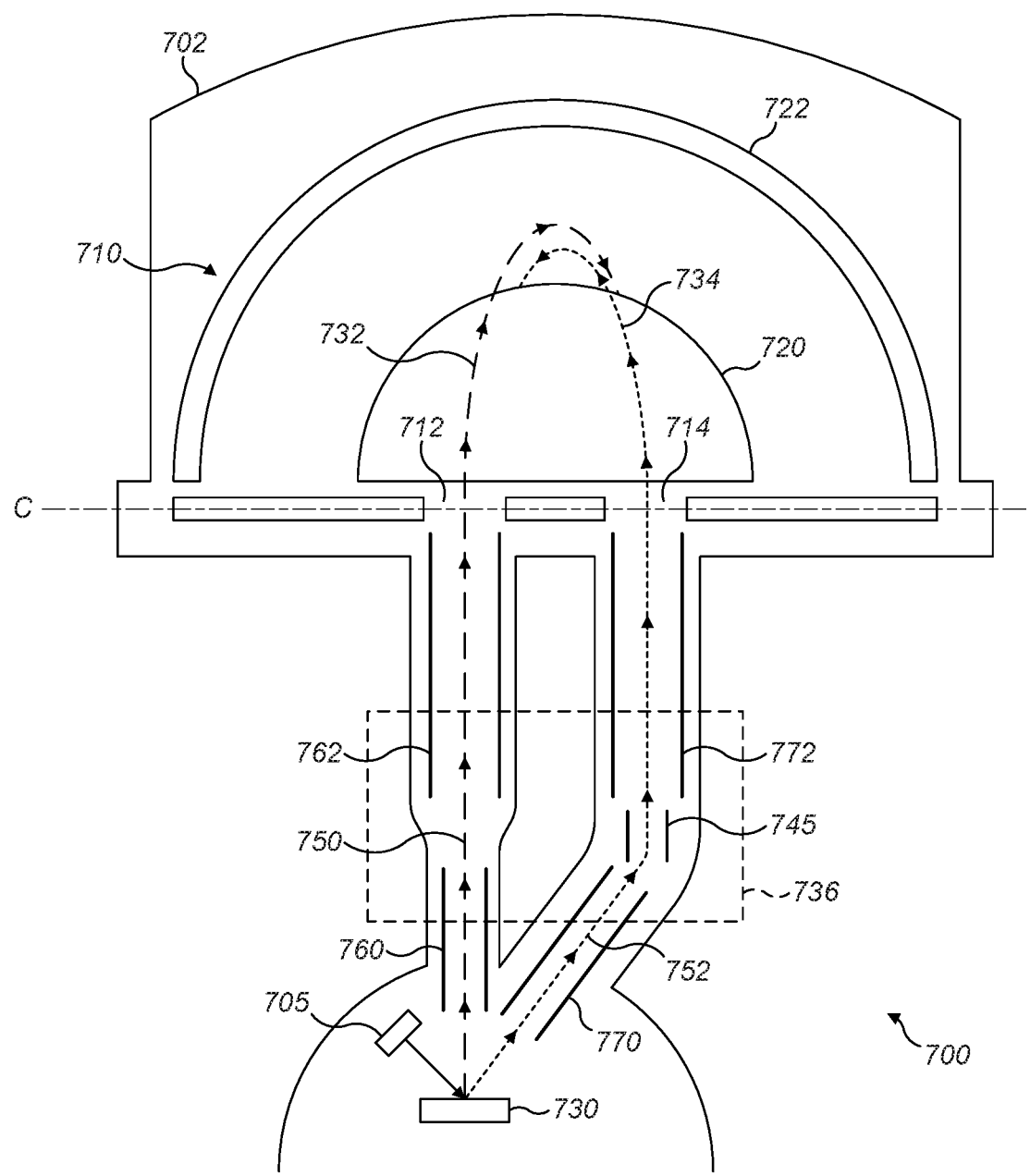
FIG. 7 is further example of an apparatus for characterisation of a sample.

Further embodiments of the invention may offer additional or alternative benefits. Another embodiment is shown in FIG. 7. FIG. 7 shows an apparatus 700 that allows simultaneous measurement of charged particles travelling on two different pathways through the apparatus. More specifically, the example of FIG. 7 provides two trajectories through the analyser, in essentially the same manner as shown in FIG. 1. However, the example of FIG. 7 demonstrates different electrostatic optics prior to entry to the analyser. Furthermore, although similar components could be used, the example of FIG. 7 does not necessarily make use of the same types of detector, or characteristics for the entrance and exit apertures (for instance, the dimensions of the entrance or exit slits), as described above with respect to FIGS. 2 to 4. FIG. 7 is shown from the perspective of arrow E, marked within FIG. 2.

The analyser 710 shown in FIG. 7 comprises a first 712 and a second 714 entrance aperture. It will be understood that the analyser 710 also comprises a first and second exit aperture, but these are not in view within the perspective of FIG. 7. In a manner similar to the example of FIG. 2, the first entrance aperture 712 is arranged radially opposite the first exit aperture, and the second entrance aperture 714 is arranged radially opposite the second exit aperture. The first entrance aperture is arranged at an azimuthal angle, a, from the second entrance aperture (in the entrance and exit plane of the analyser). Likewise, the first exit aperture is arranged at an azimuthal angle, a, from the second exit aperture.

Charged particles entering the analyser 710 through the first entrance aperture 712 pass through the analyser 710 on a first trajectory 732, eventually leaving the analyser at the first exit analyser. A first detector (not in view within the perspective of FIG. 7) is arranged aligned with the first exit aperture, such that charged particles passing through the first exit aperture are incident at the first detector. Similarly, charged particles entering the analyser 710 through the second entrance aperture 714 pass through the analyser 710 on a second trajectory 734, eventually leaving the analyser 710 through the second exit aperture. A second detector (not in view within the perspective of FIG. 7) is arranged aligned with the second exit aperture, such that charged particles passing through the second exit aperture are incident at the second detector. In this example, both the first and the second detector may be either for spectroscopy or imaging. In a particular example, both the first and the second detector may be used for spectroscopy. In this case, two detectors might be any type of detector suitable for spectroscopy. For instance each detector may be an electron or ion multiplying devices (for instance, a micro-channel plate or channel electron multiplier), together with a position sensitive detector such as an anode or delay line for collecting the signal in the case of a micro-channel plate.

The configuration of charged particle optics arranged between the sample and the analyser is different in the example of FIG. 7 compared to the example of FIGS. 3 and 4. In the example of FIG. 7, the deflector assembly 736 consists of only a single deflector 745. In this example, charged particles emitted from the sample 730 may proceed along either a first pathway 750 (towards the first entrance aperture 712) or along a second pathway 752 (towards the second entrance aperture 714). On the first pathway 750, the charged particles are not deflected, but instead pass through a first 760 and a second 762 input lens, before entering the analyser 710 through the first entrance aperture 712. On the second pathway 752, charged particles are emitted at an angle from the surface of sample 730, and collimated via a third input lens 770. The charged particles on the second pathway 752 are then deflected towards the second entrance aperture 714 of the analyser 710, via the deflector 745. The deflected charged particles subsequently pass through a fourth input lens 772, before entry into the analyser 710 through the second entrance aperture 714.

In this example, the deflector assembly 736 redirects only a portion of the charged particles. As such, this deflector assembly can be considered as performing the function of splitting the charged particle beam, as well as redirecting.

Advantageously, this configuration allows for simultaneous measurement via both the first and second pathway (and first and second trajectory through the analyser, respectively), and at both the first and second detectors. In this example, the deflector assembly 736 is not used to controllably select either a first or second mode of operation for the apparatus 700. The simultaneous twin path analysis offered by the apparatus of FIG. 7 may be particularly useful for spin polarized photoemission spectroscopy, for instance. Although theoretically there could be some interaction between the first and second trajectory though the analyser (and so a small amount of scattering of the charged particles), in practice this effect is insignificant, as most of the flux of the two analytical beams will cross and pass through each other. In some circumstances the radial (as well as the azimuthal) displacement of the first and second entrance aperture could be selected to prevent any intersection.

For reference, FIG. 7 further shows the analyser 710 being a hemispherical electrostatic analyser having an inner 720 and outer 722 hemisphere. The sample 730 is irradiated by radiation (for instance, X-rays) generated at a source 705, thereby resulting in charged particles being emitted from the surface of the sample 730. Finally, FIG. 7 shows the described components being housed in a vacuum chamber 702.

As discussed above with respect to the detailed examples of the apparatus, various benefits result from the described configurations. Particular advantages resulting from the combined effect of a first and second exit aperture (with dimensions optimised for imaging and spectroscopy, respectively), together with the use of a magnetic rotator within the spectroscopy mode have already been noted. Nevertheless, it will be understood that, despite the particular benefits outlined for the specific configurations discussed with respect to the apparatus of FIGS. 1 to 7, even in its most general form the invention can provide improved performance as a result of the provision of a single analyser with a first and second entrance and exit aperture (corresponding to a first and second trajectory though the analyser). The inventors have recognised that, as a result of this modification to the analyser, the charged particle optics preceding entry to the analyser, as well as any optics and detectors at the exit to the analyser, can be optimised for use in different modes or for different measurements. For instance, a preferred type of detector can be used within one pathway for a particular measurement, or the charged particle beam can be beneficially manipulated on one pathway in a way that would be detrimental if used in the other pathway. Thus, the claimed configuration is a powerful tool for improved spectroscopy and/or imaging within a common apparatus.

Furthermore, it is noted that the claimed invention may provide specific benefits compared to the prior art systems outlined above. For instance, the present apparatus makes use of a single analyser, avoiding a more complex structure as shown in the system of European Patent Publication No. 0,458,498. Compared to the system of U.S. Pat. No. 4,758,723, the present apparatus beneficially provides a spectroscopy detector that can make use of the full detector area (as the detector is not compromised by provision of a central hole for passing the imaging signal). The present invention can accordingly deliver increased detector efficiency. Furthermore, for the same reason, the present invention can beneficially obtain a "snapshot spectra", without the need to scan analyser voltages as required in the system of U.S. Pat. No. 4,758,723. Consequently, the present apparatus allows for much faster data acquisition.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

For instance, although the examples discussed herein assume a first detector is for imaging and a second detector is for spectroscopy, other functions can be conceived. For instance, the first and second detector may both be used for spectroscopy, or both for imaging, whilst still following the basic first and second pathway through the apparatus as outlined above. Such a configuration would still require an analyser having a first and second entrance aperture, and first and second exit aperture as discussed above.

In further examples for the described apparatus, the types of detector used as the first detector 126 and the second detector 128 can differ from those described above with reference to FIGS. 1 to 4. For example, the second detector 128 can be an angle-resolved two-dimensional detector. This type of detector is described in U.S. Pat. No. 6,104,029 and is used within the Thermo Scientific™ ThetaProbe Angle-Resolved X-ray Photoelectron Spectrometer system. Beneficially, this type of detector can collect angle-resolved spectra without the need to tilt the sample to non-destructively characterize ultra-thin layers.

Moreover, although deflection is discussed above in relation to a spectroscopy mode, this is not necessarily the case. The deflection of the charged particles could take place in an imaging mode, for instance. It is noted, however, that imaging may be more sensitive to aberrations caused by deflection of the charged particle beam. Therefore, it may be preferable to deflect the charged particle beam only in a spectroscopy mode, as outlined above with reference to the described examples.

Although a specific configuration of deflectors is discussed above with reference to FIGS. 3, 4, 5 and 7, other configurations for the deflectors could be envisaged. Specifically, the deflector could comprise any charged particle optics functioning to redirect or deflect the course of the charged particles emitted from the sample towards either the first 112 or the second 112 entrance apertures of the analyser 110. The type of deflectors shown in FIGS. 3, 4, 5 and 7 may be electrostatic field plates, for instance with strip electrodes at progressively higher voltages along one side to create approximately parallel sideways deflecting field-lines. However, other deflector configurations capable of achieving the deflection suitable for directing the charged particle beam to either the first or second entrance aperture of the analyser could be used, including electrostatic quadrupole or multipole deflectors; or magnetic deflectors (such as magnetic coil/pole-pieces creating normal magnetic field lines to sideways deflect the beam).

Electrostatic plate beam deflection is well known in the art of charged particle instrument beam optics. The effect of four square flat deflection plates has been analysed and compared with multipole flat and curved elements in reference: C. Schafer, J. Vac. Sci. Tech. B4(5) September/October 1986. Electrostatic deflector voltages applied at the deflection plates may have a magnitude from a small fraction of the energy of the deflected charged particle beam to several times the energy, depending on the geometry and field strength of the deflector. Deflector voltages are positive on one side and equal and negative on the other to deflect the beam sideways, and are proportional to the beam energy that is being analysed at any moment, in order to move charged particles with the selected energy onto the alternative input slit axis.

Magnetic deflection of charged beams is common practice in cathode ray tubes and electron microscope optics: pole pieces are arranged around the beam to create field lines perpendicular to the beam and produce a sideways movement in the charged particle beam that brings the particular beam energy being analysed and detected onto the alternative parallel input lens axis. An example of an electron beam analytical instrument with a magnetic deflection system would be U.S. Pat. No. 3,629,578A of US Phillips Corp, where the pole pieces are designed to minimise aberrations introduced into the beam.

Figure 8A:
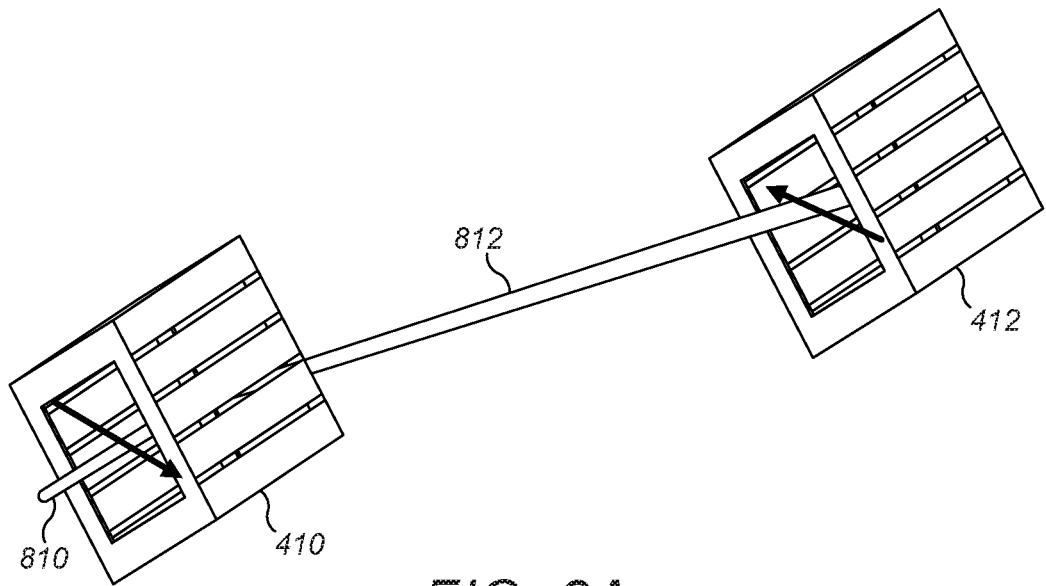
FIGS. 8A, 8B and 8C show a first example of a deflector and its characteristics.
Figure 8B:
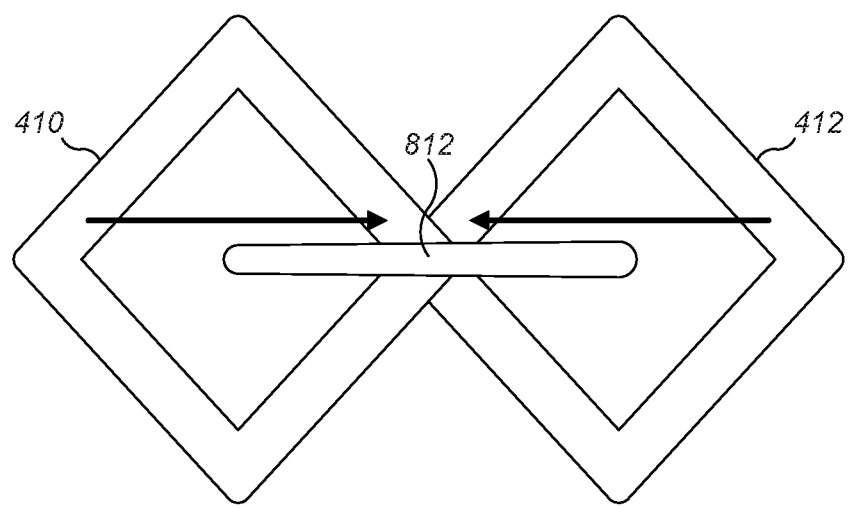
Figure 8C:
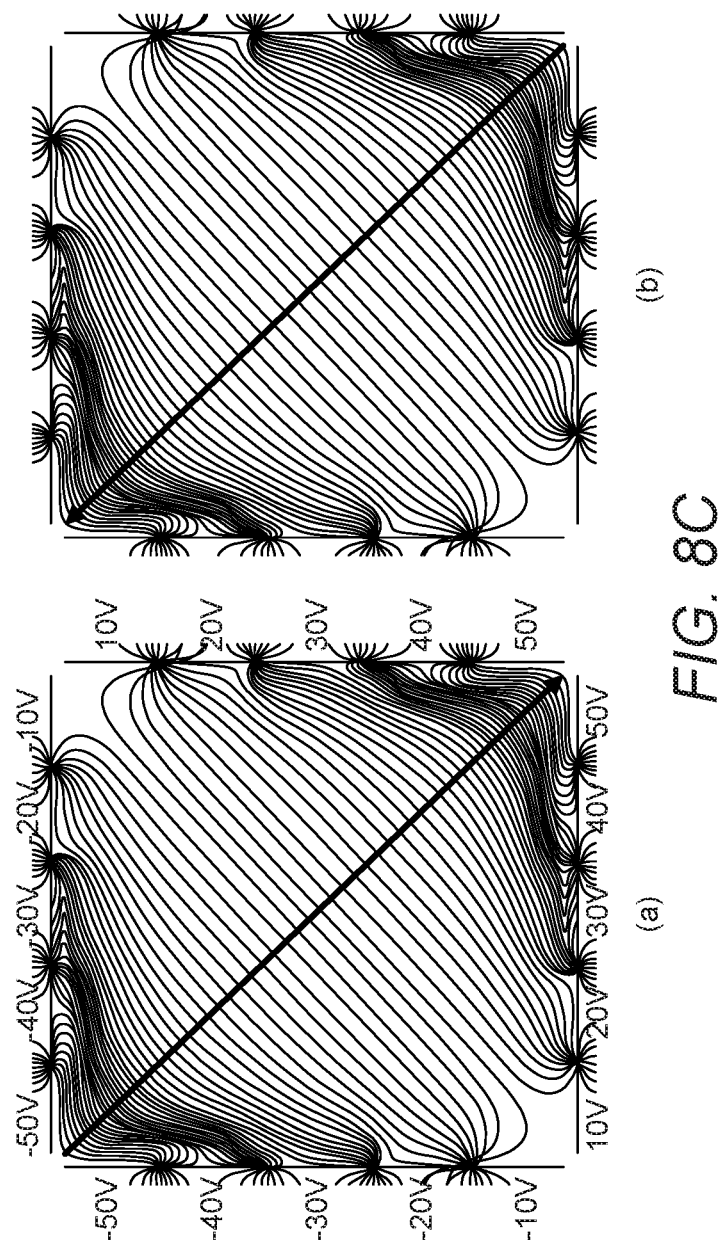

FIGS. 8A and 8B illustrate a rectangular plate/voltage strip deflector and FIG. 8C shows a model of its characteristic field. This type of deflector is used for raster scanning in ion sources, and could be used as a deflector within the above described invention.

FIG. 8A shows a perspective representation of the first deflector 410 and the second 412 deflector of the deflection assembly 136 in FIG. 5. FIG. 8B shows a representation of a plan, cross-sectional view of the same apparatus. A charged particle beam 810 is received through the first deflector 410 (in a direction out of the page in FIG. 8B), is deflected by the first deflector 410 on a deflection path 812 (in a sideways direction across the page in FIG. 8B), before being received through the second deflector 412. The field generated by the second deflector 412 applies a force to the charged particle beam in an opposite direction to the action of the field generated by the first deflector 410. This causes the doubly-deflected charged particle beam to be transmitted in a direction generally parallel to the direction of the beam before deflection, although displaced from the original particle beam pathway (the doubly-deflected charged particle beam is shown as having a direction out of the page in FIG. 8B). The arrows in FIGS. 8A and 8B represent the direction of the force applied to the charged particles by the electrostatic fields generated by each of the first and second deflectors.

FIG. 8C(a) and (b) shows a model of the electrostatic field lines generated by the first 410 and second 412 deflector, respectively. It can be seen that the first and second deflector generate a field such that the force applied to charged particles moving through the field is in an opposite direction (shown by the arrows in FIG. 8C(a) and (b)).

In a specific example, the rectangular plate/voltage strip deflector shown in FIGS. 8A, 8B and 8C show a −50V/+50V field applied across the deflector. This would steer electrons with energy of around 71 eV through a sideways deflection of around 120 mm, over a 400 mm deflector axial separation.

Figure 9A:
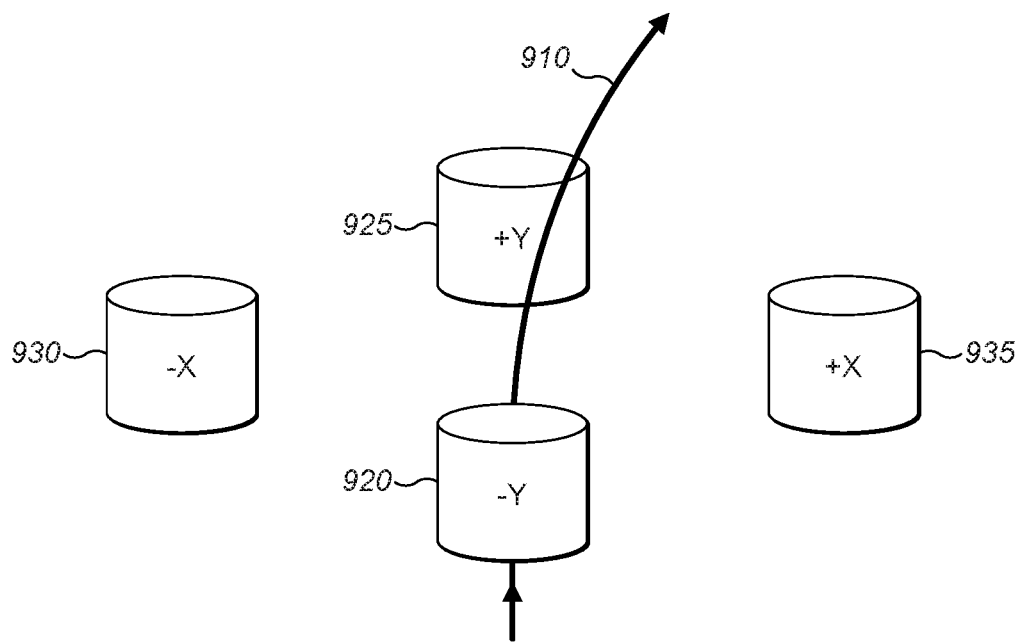
FIGS. 9A and 9B show examples of deflectors for use in a deflector assembly.

As an alternative example for the deflectors that could be used in the invention, an example of an electrostatic multipole detector is shown in FIG. 9A. This causes a deflection of charged particles moving between the poles of the deflector as demonstrated by the charged particle pathway 910. In the example of FIG. 9A, a first 930 and second 935 pole have applied voltages of opposite polarity (for example, in the region of ±500V), with the third 920 and fourth 925 pole each being held at zero voltage. Thus, in the particular case of photoelectrons moving through this type of deflector, the photoelectrons are deflected away from the negative pole 930 and in the general direction of the positive pole 935, as shown by the charge particle pathway 910 in FIG. 9A. As will be evident to the skilled person, a suitable arrangement of one or more such deflectors (for example, a pair of such deflectors, in particular arranged in an analogous manner to the deflectors shown in FIG. 8A) could be used to direct the charged particles through the apparatus, as required above in relation to the present invention.

Figure 9B:
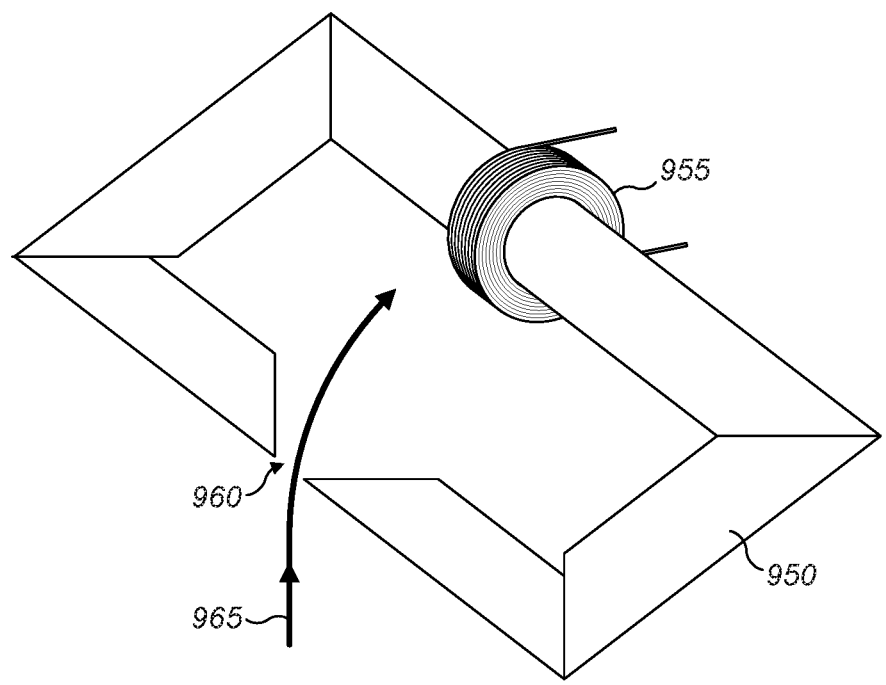

FIG. 9B shows a still further alternative form for the deflector: a magnetic deflector. A soft iron pole piece 950 is arranged having the shape of a broken square ring. A magnetic lens coil 955 is wrapped around the pole piece 950. Once activated, a deflection field is generated at the 'break' or 'gap' 960 in the pole piece. A charged particle beam 965 passing through the gap 960 (and generated field) experiences a deflection force, thereby redirecting the charged particle beam 965. Once again, as will be evident to the skilled person, a suitable arrangement of one or more such deflectors (for example, a pair of such deflectors, in particular arranged in an analogous manner to the deflectors shown in FIG. 8A) could be used to direct the charged particles through the apparatus, as required above in relation to the present invention.

It will be understood by the skilled person that the above-described examples of the deflector arrangement are not intended to be limiting. Any suitable form for the deflector arrangement could be used, such that the charged particle beam is redirected to enter the appropriate entrance aperture of the energy analyser of the present invention.

In the examples shown in FIGS. 1 to 5 and 7, a hemispherical electrostatic analyser is shown. However, the analyser does not need to be an exact hemisphere (in which charged particles entering the analyser are deflected by a full 180° before exiting the analyser). A toroidal capacitor type electrostatic energy analyser in which the charged particles are deflected by more or less than 180° could be used in place of the hemispherical electrostatic analyser shown.

Finally, the apparatus can be used for characterisation of a sample (and more particularly, a sample surface) by analysis of emitted charged particles, including ions or electrons. Although the apparatus is discussed above with reference to X-Ray Photoelectron Spectroscopy (XPS), various other techniques for electron spectroscopy (including ultraviolet photoelectron spectroscopy (UPS) and Auger electron spectroscopy (AES)), as well as ion scattering spectroscopy (ISS) and electron energy loss spectroscopy (EELS), are possible using the described apparatus. In these cases, the primary beam that irradiates the sample surface can be X-ray radiation (for XPS), ultraviolet radiation (for UPS), an electron beam (for AES or EELS), or an ion beam (for ISS). As such, the described system can be adapted to various spectroscopic techniques.

The invention claimed is:
1. An apparatus for characterisation of a sample, comprising:
  a first detector for imaging or spectroscopy;
  a second detector for imaging or spectroscopy; and
  a toroidal capacitor type electrostatic energy analyser, wherein the toroidal capacitor type electrostatic energy analyser includes a first and a second entrance aperture arranged such that charged particles emitted from a sample and passing through the first entrance aperture traverse a first trajectory through the toroidal capacitor type electrostatic energy analyser to be incident at the first detector, and charged particles emitted from a sample and passing through the second entrance aperture traverse a second trajectory through the toroidal capacitor type electrostatic energy analyser to be incident at the second detector; and a deflection assembly, arranged to direct charged particles emitted from the sample along a first path towards the first entrance aperture and/or along a second path towards the second entrance aperture of the toroidal capacitor type electrostatic energy analyser.

2. The apparatus of claim 1, wherein the first detector is for imaging, and the second detector is for spectroscopy.

3. The apparatus of claim 1, wherein the first entrance aperture to the toroidal capacitor type electrostatic energy analyser is displaced by an azimuthal angle from the second entrance aperture to the toroidal capacitor type electrostatic energy analyser.

4. The apparatus of claim 1, wherein the deflection assembly is arranged to direct charged particles emitted from a sample away from the first path and along the second path.

5. The apparatus of claim 4, wherein the deflection assembly comprises a first deflector arranged to deflect the charged particles from the first path, and a second deflector arranged to further deflect the deflected charged particles towards the second entrance aperture of the toroidal capacitor type electrostatic energy analyser.

6. The apparatus of claim 1, further comprising a rotator optics positioned on the first path or the second path, arranged such that charged particles pass through the rotator optics prior to passing through the first or the second entrance aperture, respectively.

7. The apparatus of claim 6, wherein the rotator optics is arranged on the second path.

8. The apparatus of claim 1, wherein the toroidal capacitor type electrostatic energy analyser further comprises a first and a second exit aperture, arranged such that charged particles traversing the first trajectory through the toroidal capacitor type electrostatic energy analyser pass through the first exit aperture, and charged particles traversing the second trajectory through the toroidal capacitor type electrostatic energy analyser pass through the second exit aperture.

9. The apparatus of claim 8, wherein the first and the second exit apertures comprise a first and a second exit slit, respectively, and wherein the first and second exit slits have a length in a direction perpendicular to the radial direction of the exit plane of the toroidal capacitor type electrostatic energy analyser, and wherein the length of the second exit slit is greater than the length of the first exit slit.

10. The apparatus of claim 1, wherein the toroidal capacitor type electrostatic energy analyser is an electrostatic hemispherical analyser.

11. A method of characterisation of a sample, comprising:
receiving, at a toroidal capacitor type electrostatic energy analyser, charged particles emitted from a sample, wherein the toroidal capacitor type electrostatic energy analyser includes a first and a second entrance aperture and the received charged particles pass through the first or the second entrance aperture on entry to the toroidal capacitor type electrostatic energy analyser; and
traversing the charged particles received through the first entrance aperture on a first trajectory through the electrostatic analyser to be incident at a first detector for imaging or spectroscopy, and/or traversing the charged particles received through the second entrance aperture on a second trajectory through the electrostatic analyser to be incident at a second detector for imaging or spectroscopy;

wherein prior to receiving at the toroidal capacitor type electrostatic energy analyser the charged particles emitted from the sample, the method further comprises directing charged particles emitted from the sample along a first path towards the first entrance aperture, and/or along a second path towards the second entrance aperture.

12. The method of claim 11, wherein the first detector is for imaging, and the second detector is for spectroscopy.

13. The method of claim 11, wherein a portion of the charged particles traverse the first trajectory simultaneously with a portion of the charged particles traversing the second trajectory.

14. The method of claim 11, wherein the first entrance aperture of the toroidal capacitor type electrostatic energy analyser is displaced by an azimuthal angle from the second entrance aperture of the toroidal capacitor type electrostatic energy analyser.

15. The method of claim 11, wherein directing charged particles emitted from the sample comprises directing charged particles emitted from a sample away from the first path and along the second path.

16. The method of claim 15, further comprising:
deflecting charged particles emitted from the sample from the first path; and
subsequently, deflecting the deflected charged particles towards the second entrance aperture of the toroidal capacitor type electrostatic energy analyser.

17. The method of claim 11, wherein prior to receiving charged particles emitted from a sample at a toroidal capacitor type electrostatic energy analyser, the method further comprises:
passing the charged particles through a rotator optics.

18. The method of claim 17, wherein the passing the charged particles through a rotator optics is subsequent to directing of the charged particles along a first path or along a second path, and wherein the rotator optics is positioned on the second path.

19. The method of claim 11, wherein the toroidal capacitor type electrostatic energy analyser further comprises a first and a second exit aperture, and wherein charged particles traversing the first trajectory through the toroidal capacitor type electrostatic energy analyser pass through the first exit aperture, and charged particles traversing the second trajectory through the toroidal capacitor type electrostatic energy analyser pass through the second exit aperture.

20. The method of claim 19, wherein the first and the second exit apertures comprise a first and a second exit slit, respectively, and wherein the first and second exit slits have a length in a direction perpendicular to the radial direction of the exit plane of the toroidal capacitor type electrostatic energy analyser, and wherein the length of the second exit slit is greater than the length of the first exit slit.

21. The method of claim 11, wherein the toroidal capacitor type electrostatic energy analyser is an electrostatic hemispherical analyser.

* * * * *